(12) United States Patent
Zhang et al.

(10) Patent No.: US 9,832,231 B2
(45) Date of Patent: Nov. 28, 2017

(54) UNIFIED GENERATION OF POLICY UPDATES

(71) Applicant: Microsoft Technology Licensing, LLC, Redmond, WA (US)

(72) Inventors: Hao Zhang, Sammamish, WA (US); Anatoly Koretsky, San Antonio, TX (US); Lucy Chao, Bellevue, WA (US); Mashuri Libman, Woodinville, WA (US); Neelamadhaba Mahapatro, Bellevue, WA (US); Krishna Kumar Parthasarathy, Redmond, WA (US); Sowmy Srinivasan, Redmond, WA (US); Sridharan Ramanathan, Kirkland, WA (US); Jack Kabat, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/165,711

(22) Filed: May 26, 2016

(65) Prior Publication Data
US 2016/0277449 A1 Sep. 22, 2016

Related U.S. Application Data

(62) Division of application No. 14/340,126, filed on Jul. 24, 2014, now Pat. No. 9,380,074, which is a division
(Continued)

(51) Int. Cl.
*G06F 21/00* (2013.01)
*H04L 29/06* (2006.01)
(Continued)

(52) U.S. Cl.
CPC ............ *H04L 63/20* (2013.01); *G06F 3/0484* (2013.01); *G06F 17/2705* (2013.01);
(Continued)

(58) Field of Classification Search
CPC ...................................................... H04L 63/20
See application file for complete search history.

(56) References Cited

U.S. PATENT DOCUMENTS 6,684,244 B1 1/2004 Goldman et al.
7,478,422 B2 1/2009 Valente et al.
(Continued)

FOREIGN PATENT DOCUMENTS

EP 1143665 A2 10/2001

OTHER PUBLICATIONS

Notice of Allowance for U.S. Appl. No. 14/327,886 dated Jun. 30, 2016, 14 pages.
(Continued)

*Primary Examiner* — Morshed Mehedi
(74) *Attorney, Agent, or Firm* — Christopher J. Volkmann; Kelly, Holt & Christenson, PLLC

(57) ABSTRACT

User input mechanisms are displayed for defining a compliance policy update. A unified compliance policy update is generated according to a unified schema that is consistent across different workloads. The unified compliance policy update is sent to a workload where it is deployed.

20 Claims, 45 Drawing Sheets

Related U.S. Application Data of application No. 14/327,886, filed on Jul. 10, 2014, now Pat. No. 9,432,405.

(60) Provisional application No. 61/947,195, filed on Mar. 3, 2014.

(51) Int. Cl.

| | | |
|---|---|---|
| *H04L 12/24* | (2006.01) | |
| *G06Q 10/06* | (2012.01) | |
| *G06Q 10/10* | (2012.01) | |
| *G06F 3/0484* | (2013.01) | |
| *G06F 17/27* | (2006.01) | |

(52) U.S. Cl.

CPC ............. *G06Q 10/06* (2013.01); *G06Q 10/10* (2013.01); *H04L 41/0893* (2013.01); *G06F 21/00* (2013.01); *H04L 29/06* (2013.01)

(56) References Cited

U.S. PATENT DOCUMENTS

| | | | |
|---|---|---|---|
| 7,797,739 B2 | 9/2010 | Andreev et al. | |
| 7,885,943 B1 | 2/2011 | Yehuda et al. | |
| 8,104,080 B2 | 1/2012 | Burns et al. | |
| 8,127,350 B2 | 2/2012 | Wei et al. | |
| 8,209,738 B2* | 6/2012 | Nicol | H04L 41/142 |
| | | | 709/224 |
| 8,352,998 B1 | 1/2013 | Kougiouris et al. | |
| 8,396,838 B2* | 3/2013 | Brockway | G06F 17/30616 |
| | | | 707/662 |
| 8,499,331 B1 | 7/2013 | Yehuda et al. | |
| 8,621,550 B1 | 12/2013 | Yehuda et al. | |
| 8,677,448 B1 | 3/2014 | Kauffman et al. | |
| 9,053,460 B2 | 6/2015 | Gilbert et al. | |
| 9,137,096 B1 | 9/2015 | Yehuda et al. | |
| 9,143,529 B2 | 9/2015 | Qureshi et al. | |
| 9,183,380 B2 | 11/2015 | Qureshi et al. | |
| 9,213,850 B2 | 12/2015 | Barton et al. | |
| 9,286,471 B2 | 3/2016 | Qureshi et al. | |
| 9,379,937 B2 | 6/2016 | Crudele et al. | |
| 9,380,074 B2 | 6/2016 | Zhang et al. | |
| 9,432,405 B2 | 8/2016 | Zhang et al. | |
| 9,444,847 B2 | 9/2016 | Zhang et al. | |
| 2003/0154404 A1* | 8/2003 | Beadles | H04L 63/20 |
| | | | 726/1 |
| 2004/0177352 A1 | 9/2004 | Narayanaswamy et al. | |
| 2004/0193703 A1 | 9/2004 | Loewy et al. | |
| 2004/0193912 A1* | 9/2004 | Li | G06F 21/55 |
| | | | 726/14 |
| 2004/0268229 A1* | 12/2004 | Paoli | G06F 17/243 |
| | | | 715/200 |
| 2005/0015622 A1 | 1/2005 | Williams et al. | |
| 2006/0089938 A1* | 4/2006 | Leonard | H04L 41/00 |
| 2006/0130133 A1 | 6/2006 | Andreev et al. | |
| 2007/0124797 A1 | 5/2007 | Gupta et al. | |
| 2007/0180490 A1 | 8/2007 | Renzi et al. | |
| 2008/0092235 A1* | 4/2008 | Comlekoglu | G06F 11/326 |
| | | | 726/22 |
| 2008/0184201 A1 | 7/2008 | Burns et al. | |
| 2008/0184277 A1 | 7/2008 | Burns et al. | |
| 2008/0301765 A1* | 12/2008 | Nicol | H04L 41/142 |
| | | | 726/1 |
| 2009/0063584 A1* | 3/2009 | Abzarian | G06F 8/71 |
| 2009/0138940 A1* | 5/2009 | Liu | G06F 21/62 |
| | | | 726/1 |
| 2009/0228579 A1 | 9/2009 | Sanghvi et al. | |
| 2009/0241165 A1* | 9/2009 | Tyree | G06Q 10/06 |
| | | | 726/1 |
| 2010/0125477 A1 | 5/2010 | Mousseau et al. | |
| 2010/0262902 A1* | 10/2010 | Burns | G06F 8/38 |
| | | | 715/234 |
| 2011/0112974 A1* | 5/2011 | Hinton | G06Q 10/06 |
| | | | 705/317 |
| 2011/0125894 A1 | 5/2011 | Anderson et al. | |
| 2011/0167470 A1 | 7/2011 | Walker et al. | |
| 2012/0011517 A1* | 1/2012 | Smith | G06F 11/3006 |
| | | | 718/104 |
| 2012/0023546 A1 | 1/2012 | Kartha et al. | |
| 2012/0102541 A1* | 4/2012 | Groskop | G06F 21/577 |
| | | | 726/1 |
| 2012/0110059 A1 | 5/2012 | Nukala et al. | |
| 2013/0086626 A1* | 4/2013 | Kavantzas | H04L 63/10 |
| | | | 726/1 |
| 2013/0091333 A1* | 4/2013 | Marisamy | G06F 11/3409 |
| | | | 711/162 |
| 2013/0174168 A1 | 7/2013 | Abuelsaad et al. | |
| 2013/0227105 A1 | 8/2013 | Crudele et al. | |
| 2013/0227109 A1 | 8/2013 | Crudele et al. | |
| 2013/0262392 A1 | 10/2013 | Vibhor et al. | |
| 2013/0268861 A1 | 10/2013 | Bailey et al. | |
| 2013/0291052 A1 | 10/2013 | Hadar et al. | |
| 2014/0020045 A1 | 1/2014 | Kabat et al. | |
| 2014/0222521 A1 | 8/2014 | Chait | |
| 2014/0222522 A1 | 8/2014 | Chait | |
| 2014/0278623 A1* | 9/2014 | Martinez | G06F 8/36 |
| | | | 705/7.12 |
| 2014/0331277 A1 | 11/2014 | Frascadore et al. | |
| 2015/0067767 A1 | 3/2015 | Shimizu et al. | |
| 2015/0143524 A1 | 5/2015 | Chestna | |
| 2015/0249681 A1 | 9/2015 | Zhang et al. | |
| 2015/0249682 A1 | 9/2015 | Zhang et al. | |
| 2015/0249683 A1 | 9/2015 | Zhang et al. | |
| 2015/0249684 A1 | 9/2015 | Zhang et al. | |

OTHER PUBLICATIONS

Issue Notification for U.S. Appl. No. 14/340,126 dated Jun. 8, 2016, 1 page.

Issue Notification for U.S. Appl. No. 14/327,886 dated Aug. 10, 2016, 1 page.

Issue Notification for U.S. Appl. No. 14/336,815 dated Aug. 24, 2016, 1 page.

Application and Drawings for U.S. Appl. No. 15/215,032, filed Jul. 20, 2018, 92 pages.

Amendment for U.S. Appl. No. 14/337,793 dated Jul. 7, 2016, 108 pages.

Non-Final Office Action for U.S. Appl. No. 15/215,032 dated Oct. 7, 2016, 21 pages.

Prosecution History for U.S. Appl. No. 14/337,793 including: Response to Notice of Non-Compliant Amendment dated Nov. 3, 2016 and Notice of Non-Compliant Amendment dated Oct. 20, 2016, 112 pages.

Prosecution History for U.S. Appl. No. 15/215,032 including: Terminal Disclaimer filed Dec. 13, 2016 and Amendment filed Dec. 12, 2016, 14 pages.

Final Office Action for U.S. Appl. No. 14/337,793 dated Feb. 10, 2017, 20 pages.

Notice of Allowance for U.S. Appl. No. 15/215,032 dated Feb. 21 2017, 11 pages.

Watson, Charles D., "Unified Network Policy Control with the Sandvine Policy Engine", Mar. 10, 2014, Available at: http://www.sandvine.com/downloads/general/platform/the-sandvine-platform-unified-network-policy-control.pdf.

Geisenberger, et al., "Integrate Multiple Compliance Activities into a Unified, Enterprise-Wide Compliance Program", In Proceedings of Wellesley Information Services, Apr. 23, 2012, 26 pages.

Wellington, Dominic, "Configuration and Compliance: Two Halves of a Whole", Retrieved on: Mar. 10, 2014, Available at: http://www.ciscoexpo.ru/expo2012/sites/default/files/PDFDone/day2/DataCenters/09_30_10_00_ConfgurationAndComplianceTwoHalvesOfAWhole_BMC.pdf.

International Search Report and Written Opinion for International Application No. PCT/US2015/018219, dated Jun. 8, 2015, date of filing: Mar. 2, 2015, 10 pages.

No stated author; Symantec-Data Loss Prevention Administration Guide; version 12.0; 2013; Retrieved from the Internet <URL:clientui-kb.symantec.com/resources/sites/BUSINESS/con-

(56) References Cited

OTHER PUBLICATIONS tent/live/TECHNICAL_SOLUTION/222000/TECH222490/en_US/Symantec_DLP_12.0_Admin_Guide.pdf>pp. 1-1472 as printed.

Second Written Opinion for International Patent Application No. PCT/US2015/018219, dated Jan. 25, 2018, date of filing; Mar. 2, 2015, 5 pages.

International Preliminary Report on Patentability for International Patent Application No. PCT/US2015/018219, dated May 20, 2016, date of filing: Mar. 2, 2015, 16 pages.

Prosecution History for U.S. Appl. No. 14/340,126 including: Notice of Allowance dated Mar. 9, 2016, Amendment dated Dec. 22, 2015, Non-Final Office Action dated Sep. 22, 2015, Response to Restriction Requirement dated Aug. 13, 2015, Requirement for Restriction dated Aug. 7, 2015, Application and Drawings filed Jul. 24, 2014, 146 pages.

Prosecution History for U.S. Appl. No. 14/336,815 including: Notice of Allowance dated May 2016, Examiner Initiated Interview Summary dated May 13, 2016, Amendment dated Dec. 28, 2015, Applicant Initiated Interview Summary dated Dec. 23, 2015, Non-Final Office Action dated Sep. 25, 2015, and Application and Drawings filed Jul. 21, 2014, 140 pages.

Prosecution History for U.S. Appl. No. 14/337,793 including: Non-Final Office Action dated Apr. 11, 2016, Applicant Initiated Interview Summary dated Dec. 31, 2015, Amendment dated Dec. 21, 2015, Non-Final Office Action dated Aug. 21, 2015, and Application and Drawings filed Jul. 22, 2014, 146 pages.

Prosecution History for U.S. Appl. No. 14/327,886 including: Amendment dated May 17, 2016, Applicant Initiated Interview Summary dated Mar. 7, 2016, Non-Final Office Action dated Dec. 18, 2015, Application and Drawings filed Jul. 10, 2014, 137 pages.

* cited by examiner archiving & deletion    hold

Locate specific pieces of your organization's data and place them on hold to preserve the information. Looking to manage older policies? Go to the Admin center to manage existing Mailbox Holds and the In-Place Hold Policy Center for holds in SharePoint.

+ ▼ / ■ ● ● ...

| NAME ▲ | LAST MODIFIED | STATUS |
|---|---|---|
| North Wind case | Tuesday, 8/1/2013, 1:30 PM | Enabled |
| South Wind case | Tuesday, 8/2/2013, 2:30 PM | Disabled |

North Wind Case
15 mailboxes, 7 sites
Holding indefinitely

Last modified
11/13/2013 12:43:01 AM
Modified by: J. Doe

In-place hold
| Enabled |
| Disable hold |

Last update: 2/4/2014 7:06AM PST

New hold policy archiving & deletion hold

Locate specific pieces of your organization manage older policies? Go to the Admin Center for holds in SharePoint.

+ ▼ / ■ ● ○ ...

| NAME ▲ | LAST MODIFIED |
|---|---|
| North Wind case | Tuesday, 8/1/2013 |
| South Wind case | Tuesday, 8/2/2013 |

What would you like us to look for?

August AND (financial NEAR repo*)

You can enter a few keywords or leave this blank to search for all content. What can I say?

Start date: 9/24/13 ▼    End date: ▼

Choose a start and end date to limit the scope to a specific timeframe, or include results regardless of the date.

Where would you like us to look?
Choose where you would like to include content from. You'll pick the exact data a little later.

☒ Mailboxes
☒ Sites

[Cancel]    [back] [next]

Last update: 2/4/2014 7:06AM PST

FIG. 3F

FIG. 3G archiving & deletion    hold

Locate specific pieces of your organization's data and place them on hold to preserve the information. Looking to manage older policies? Go to the Admin center to manage existing Mailbox Holds and the In-Place Hold Policy Center for holds in SharePoint.

+ ▼ / 🔔 🔍 ○ ...

| NAME ▲ | LAST MODIFIED | STATUS | |
|---|---|---|---|
| North Wind case | Tuesday, 8/1/2013, 1:30 PM | Enabled (Deploying) | North Wind Case<br>15 mailboxes, 7 sites<br>Holding indefinitely<br><br>Last modified<br>11/13/2013 12:43:01 AM<br>Modified by: J. Doe<br><br>In-place hold<br>Enabled, deployment in progress<br>Disable hold |
| South Wind case | Tuesday, 8/2/2013, 2:30 PM | Disabled | |

Last update: 2/4/2014 7:06AM PST

FIG. 4C archiving & deletion    hold

Locate specific pieces of your organization's data and place them on hold to preserve the information. Looking to manage older policies? Go to the Admin center to manage existing Mailbox Holds and the In-Place Hold Policy Center for holds in SharePoint.

+ ▼ / ■ ● ○ ⋯

| NAME ▲ | LAST MODIFIED | STATUS |
|---|---|---|
| North Wind case | Tuesday, 8/1/2013, 1:30 PM | Enabled (Errors) |
| South Wind case | Tuesday, 8/2/2013, 2:30 PM | Disabled |

North Wind Case
15 mailboxes, 7 sites
Holding indefinitely

Last modified
11/13/2013 12:43:01 AM
Modified by: J. Doe

In-place hold
Enabled (Errors)
Disable policy 3 errors occurred
View details Last update: 2/4/2014 7:06AM PST

FIG. 4E archiving & deletion    hold

Locate specific pieces of your organization's data and place them on hold to preserve the information. Looking to manage older policies? Go to the Admin center to manage existing Mailbox Holds and the In-Place Hold Policy Center for holds in SharePoint.

| NAME | LAST MODIFIED | STATUS |
|---|---|---|
| | Tuesday, 8/1/2013, 1:30 PM | Enabled |
| Sou... | Tuesday, 8/2/2013, 2:30 PM | Disabled |

North Wind Case
15 mailboxes, 7 sites
Holding indefinitely

Last modified
11/13/2013 12:43:01 AM
Modified by: J. Doe

In-place hold
Enabled
Disable hold

Last update: 2/4/2014 7:06AM PST

FIG. 5A

FIG. 5B

UNIFIED GENERATION OF POLICY UPDATES

CROSS-REFERENCE TO RELATED APPLICATIONS

The present application is a divisional of and claims priority to U.S. patent application Ser. No. 14/340,126, which is based on and claims the benefit of U.S. provisional patent application Ser. No. 61/947,195, filed Mar. 3, 2014, the contents of which are hereby incorporated by reference in their entirety.

BACKGROUND

Computer systems are currently in wide use. Some computer systems have compliance policies associated with them. The compliance policies often apply to the data that is generated or used in the computer system.

By way of example, an electronic mail system may have certain compliance policies. For instance, it may be that a compliance policy exists by which any electronic mail message that contains a customer's social security number must be encrypted prior to being sent. A document management system may also have associated compliance policies. For instance, for legal reasons, it may be that certain business documents must be maintained or stored for a certain number of years, before they are deleted. Of course, these and a wide variety of other computer systems can have many additional or different compliance policies associated with them as well.

Currently, compliance policies are managed separately in each different type of computer system. For instance, an electronic mail computer system has its own compliance policies which are managed within that system. A document management system has its own compliance policies which are managed within that system. Electronic meeting computer systems often have compliance policies which are managed within that system as well. The tasks to configure the compliance policies in each of the systems can be cumbersome and difficult.

The discussion above is merely provided for general background information and is not intended to be used as an aid in determining the scope of the claimed subject matter.

SUMMARY

User input mechanisms are displayed for defining a compliance policy update. A unified compliance policy update is generated according to a unified schema that is consistent across different workloads. The unified compliance policy update is sent to a workload where it is deployed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4A-4F show various examples of user interface displays.

FIGS. 5A-5D show various examples of user interface displays.

DETAILED DESCRIPTION

Figure 1:
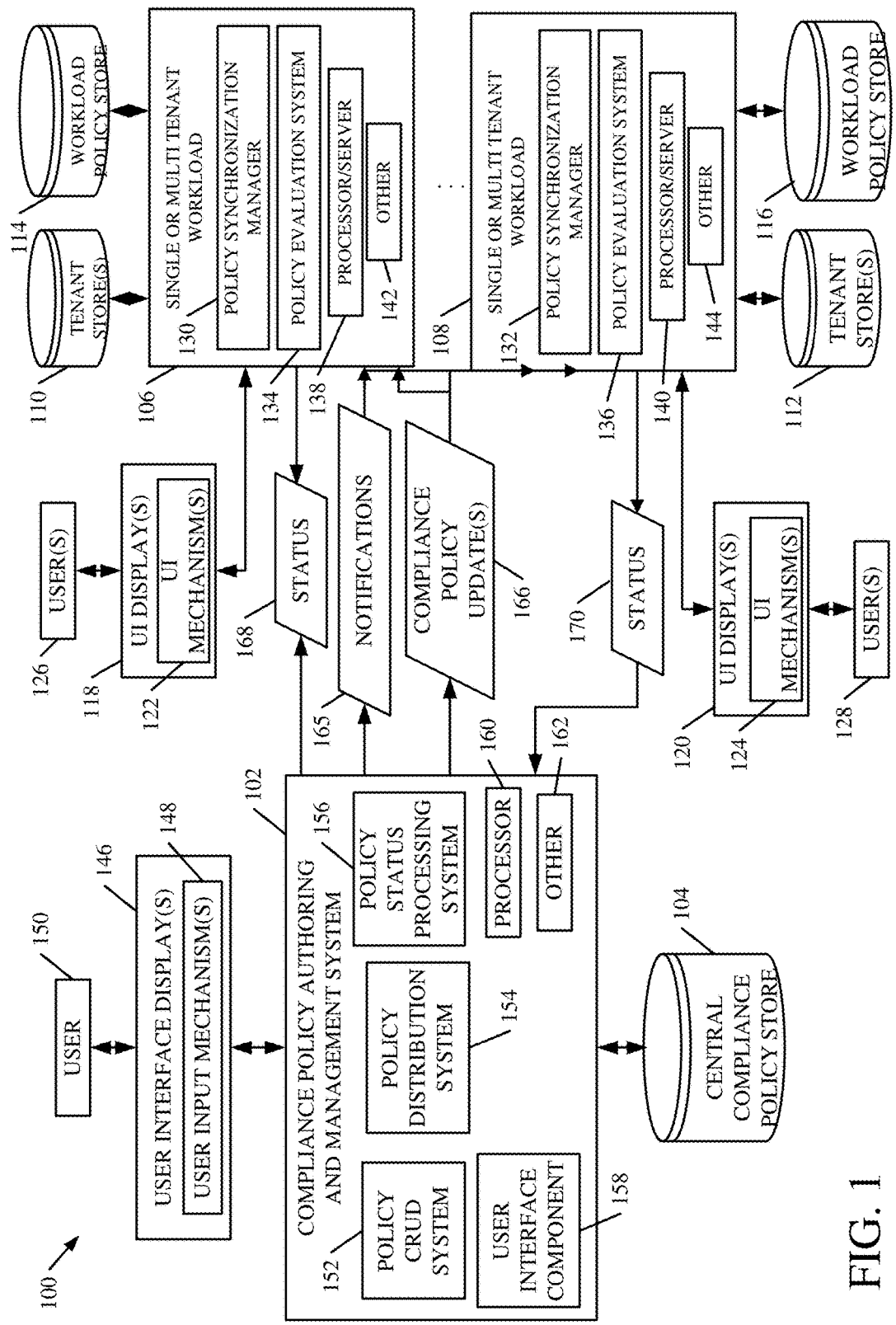
FIG. 1 is a block diagram of one example of a compliance policy architecture.

FIG. 1 is a block diagram of one example of a compliance policy architecture 100. Architecture 100 can be used to author or update compliance policies and distribute them to systems where they are applied.

In the example shown in FIG. 1, architecture 100 includes compliance policy authoring and management system 102, central compliance policy store 104, a plurality of different workloads 106-108, each of which have a tenant data store 110-112 and a policy store 114-116.

In the example shown in FIG. 1, each workload 106-108 can be a single tenant or multi-tenant workload that comprises a computer system that generates a set of user interface displays 118-120, with user input mechanisms 122-124, for interaction by users 126-128. Users 126-128 interact with the user input mechanisms 122-124 in order to control and manipulate workloads 106-108, respectively. By way of example, workload 106 may be an electronic mail computer system while workload 108 may be a document management computer system, an electronic meeting computer system, etc. Each workload illustratively has a policy synchronization manager 130-132, a policy evaluation system 134-136, one or more processors or servers 138-140, and they can include other items 142-144 as well.

The example shown in FIG. 1 also illustrates that compliance policy authoring and management system 102 can, itself, generate user interface displays 146 with user input mechanisms 148 for interaction by user 150. User 150 can illustratively interact with user input mechanisms 148 in order to generate or update compliance policies using system 102, and to have those policies synchronized to workloads 106-108, where they are applied. Thus, compliance policy authoring and management system 102 illustratively includes policy CRUD system 152, policy distribution system 154, policy status processing system 156, user interface component 158, one or more processors or servers 160 and it can include other items 162 as well. Before describing the overall operation of architecture of 100 in more detail, a brief overview will first be provided.

User 150 first accesses system 102 in order to generate a compliance policy update. This can be to add one or more new compliance policies or rules, to delete them or to modify them. In any case, policy CRUD system 152 provides functionality that allows user 150 to do that. The policies are represented by a unified schema that is the same across all different workloads. User 150 then invokes policy distribution system 154 that distributes the compliance policy updates 166 to the various workloads 106-108 where they are to be applied. Policy distribution system 154 sends notifications 165 to workloads 106-108 that policy updates 166 are available for them. Policy synchronization managers 130-132 then pull the compliance updates 166 so that they can be applied in workloads 106-108, respectively. The synchronization managers 130 and 132 in the workloads 106-108 synchronize the compliance policy updates 166 to their respective workload policy stores 114-116. Synchronization managers 130-132 communicate statuses 168-170, respectively, back to policy status processing system 156 where the status of the application of the compliance policy updates 166 is communicated to user 150. The compliance policies can then be used during runtime by a unified policy evaluation system that is the same in each workload. The workload coverts items (like emails and documents) to be analyzed under the compliance policies into a unified representation that is the same across the workloads. The unified policy evaluation system evaluates the items and can call the workload to create instances of action objects that will perform workload-specific actions when a compliance policy is triggered.

Figure 1A:
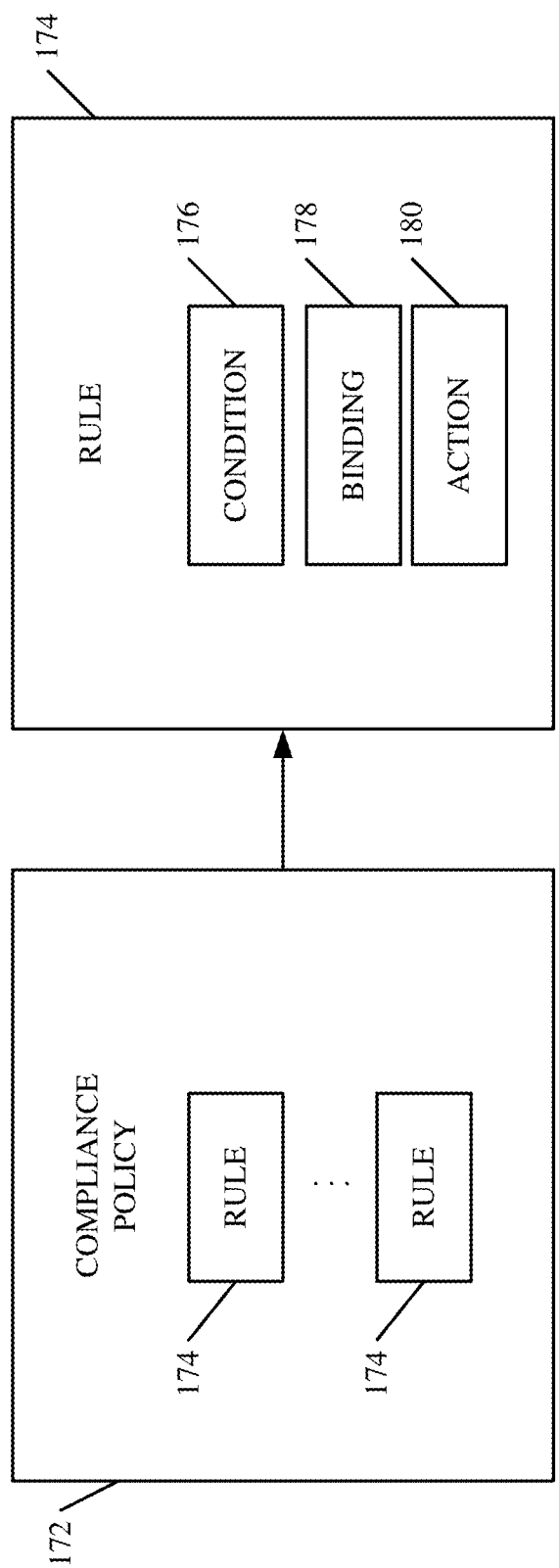
FIG. 1A is a block diagram showing one example of a compliance policy.

FIG. 1A shows one example of a compliance policy 172. Compliance policy 172 is illustratively a collection of rules 174. Each rule 174 illustratively includes one or more predicates that are a collection of conditions 176 that indicate when the rule is to be applied. They also illustratively include a set of bindings 178 that indicate what particular items within workloads 106-108 the rules are to be applied to, and they may indicate actions 180 indicating the type of actions that are to be taken, when a compliance policy rule is triggered by an item of content in one of the workloads 106-108.

By way of example, a predicate for a rule 174 may combine a set of conditions using a logical AND operation. The conditions 176 of rule 174 may be that the body of an electronic mail message contains the word "foo" and the word "bar". The binding 178 may be a list of electronic mail accounts or mailboxes that are to be evaluated for this rule 174, and the action 180 may be that the electronic mail message containing the word "foo" and the word "bar" is encrypted.

Figure 2:
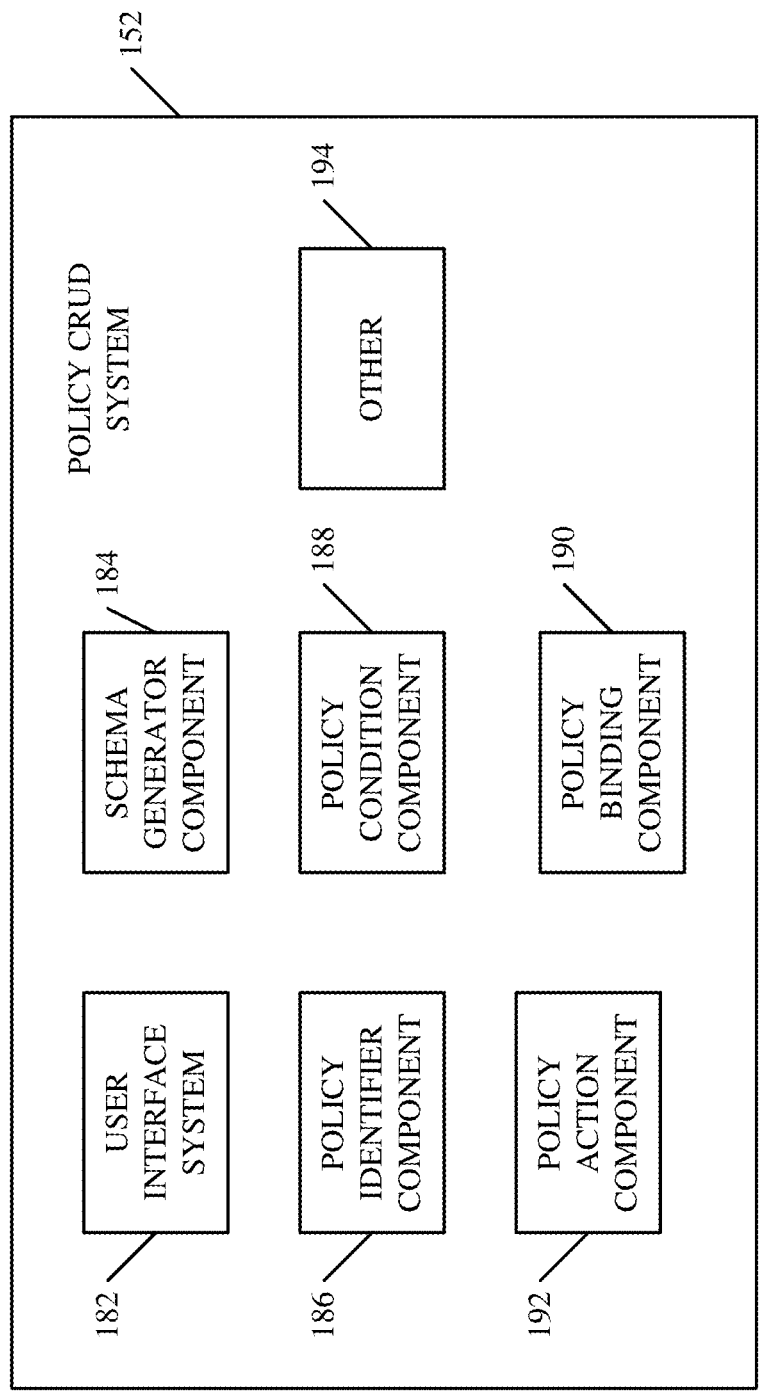
FIG. 2 is a block diagram showing one example of a policy create, read, update and deleted (CRUD) system.

FIG. 2 is a block diagram illustrating one example of a policy CRUD system 152 in more detail. In the example shown in FIG. 2, policy CRUD system 152 includes a user interface system 182, schema generator component 184, policy identifier component 186, policy condition component 188, policy binding component 190, policy action component 192, and it can include other items 194 as well.

User interface system 182 can generate user interface displays 146 that allow user 150 to generate compliance policy updates. Schema generator component 184 illustratively generates a schema, that is unified across all workloads 106-108, to represent the policy update. Policy identifier component 186 allows user 150 to identify an update as a new policy or a modification to a policy. Policy condition component 186 allows user 150 to identify the conditions associated with the new policy or the update. Policy binding component 190 allows user 150 to bind the new policy or updates to various items in the workloads 106-108, and policy action component 192 allows user 150 to specify actions associated with a new policy, or to modify the actions associated with an existing policy.

Figure 3:
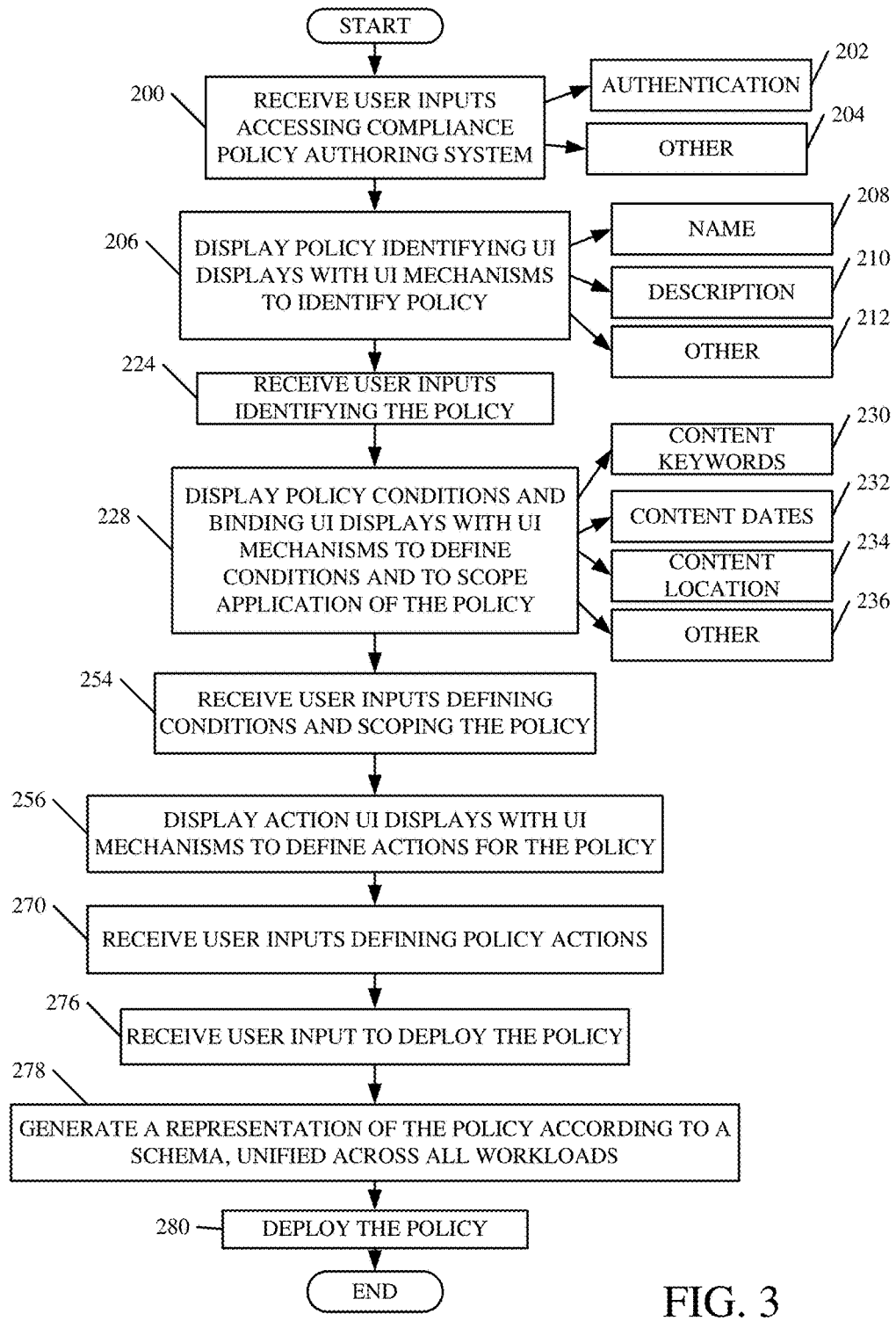
FIG. 3 is a flow diagram illustrating one example of the operation of the architecture shown in FIG. 1 is creating a compliance policy.

FIG. 3 is a flow diagram illustrating one example of the operation of policy CRUD system 152 in allowing user 150 to specify a new compliance policy. Specifying a new compliance policy is, of course, included as a compliance policy update 166 shown in FIG. 1. Therefore, it is to be provided to the relevant workloads 106-108 through their policy synchronization managers 130-132. FIGS. 3A-3Q show examples of user interface displays that can be generated in allowing user 150 to create a new compliance policy.

Compliance policy authoring and management system 102 first receives a user input indicating that the user wishes to access the compliance policy authoring and management system 102 in order to generate a new compliance policy. This is indicated by block 200 in FIG. 3. By way of example, user 150 can provide an authentication input 202, or other inputs 204.

In response, policy CRUD system 152 displays a set of user interface displays that allow user 150 to generate the new compliance policy. First, for example, it can display one or more policy identifying user interface displays with mechanisms that allow user 150 to identify the new policy. This is indicated by block 206. The policy identifying user interface displays can allow user 150 to input a policy name 208, a policy description 210, and other identifying information 212.

FIG. 3A shows one example of a user interface display 214 that indicates this. It can be seen in FIG. 3A that two sets of compliance policies are shown. One for "North Wind Case" and one for "South Wind Case". The user has selected the "North Wind Case" set of compliance policies and is actuating a user input mechanism 216 that allows user 150 to add to the compliance policies.

It will be noted that the present description proceeds with respect to user 150 adding a hold policy. This is a policy that determines how long and under what conditions certain types of data are to be stored. For instance, certain kinds of data may be stored, for legal reasons, for a certain number of years. Other data may be stored, by default, for a certain number of years, but it may be otherwise deleted by the user at any time. Still other data may be automatically deleted after a certain period of time, and other information may be stored indefinitely. Of course, this is but one type of compliance policy and a wide variety of other compliance policies can be implemented. The one described is described for the sake of example only.

Figure 3B:
FIGS. 3A-3Q show examples of user interface displays.
Figure 3C:
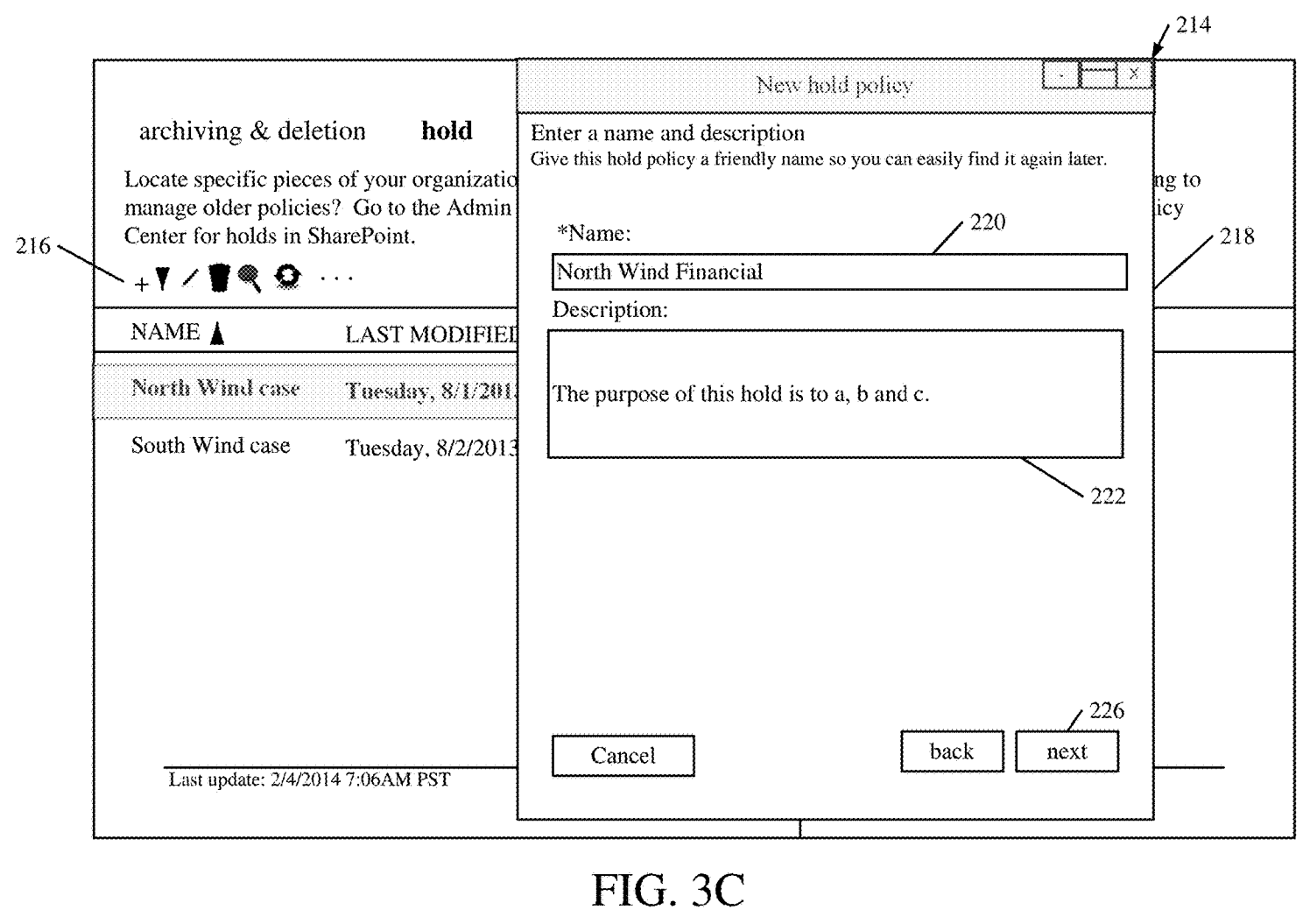

FIG. 3B shows another example of user interface display 214. It can be seen in FIG. 3B that policy identifier component 186 has generated a pop-up display 218 that allows the user to enter policy identifying information. Display 218 has a name text box 220 and a description text box 222. User 150 can illustratively enter a name in text box 220 and a description of the compliance policy in text box 222. In FIG. 3C, it can be seen that the user has entered the name "North Wind Financial" to identify the compliance policy. The user has also entered a description as "the purpose of this hold is to A, B and C". Receiving user inputs identifying the policy is indicated by block 224 in the flow diagram of FIG. 3. Once the policy identifying inputs are complete, the user can advance, such as by actuating the "next" button 226.

Policy condition component 188 and policy binding component 190 then illustratively generate user interface displays that allow user 150 to define predicates and conditions for the policy being created and to provide scope inputs that indicate what the policy being authored is to bind or apply to. This is indicated by block 228 in FIG. 3. Table 1 below is a table showing some examples of predicates. Table 1 below can be read as a prefix plus a suffix. The prefix is the parent node and the suffix is the child node (e.g., CreationDateEqual, CreationDateGreaterThan, etc.)

TABLE 1

CreationDate

Equal
GreaterThen
GreaterThenOrEqual
LessThen
LessThenOrEqual
NotEqual
Exists
Creator Is
Exists
Matches
ContainsWords
LastModified Equal
GreaterThen
GreaterThenOrEqual
LessThen
LessThenOrEqual
NotEqual
Exists
LastModifier Is
Exists
Matches
ContainsWords
Name Is
Exists
Matches
ContainsWords
MatchesPatterns
Extension - file name extension Is
Exists
Matches
ContainsWords
MatchesPatterns
Body ContainsClassifications
Is
Exists
Matches
ContainsWords
SizeOver TABLE 1-continued Attachment ContrainsClassifications
Is
Exists
Matches
ContainsWords
SizeOver
IsExecutable
IsBinaryTypeOf
Or
True
False
And
Not By way of example, the UI displays may allow user 150 to provide content keywords 230. It can allow user 150 to identify that a condition is that these keywords are present in the content of the item being analyzed. It may also allow user 150 to provide content dates 232. Therefore, only content that is dated within the dates provided will be analyzed under this policy. It may be that it allows user 150 to provide a content location (such as certain URLs that contain content, certain e-mail addresses or inboxes, etc.), that the compliance policy is to be bound to. This indicates the location 234 of content where the compliance policy will apply. The conditions and binding inputs can include other items 236 as well.

Figure 3D:
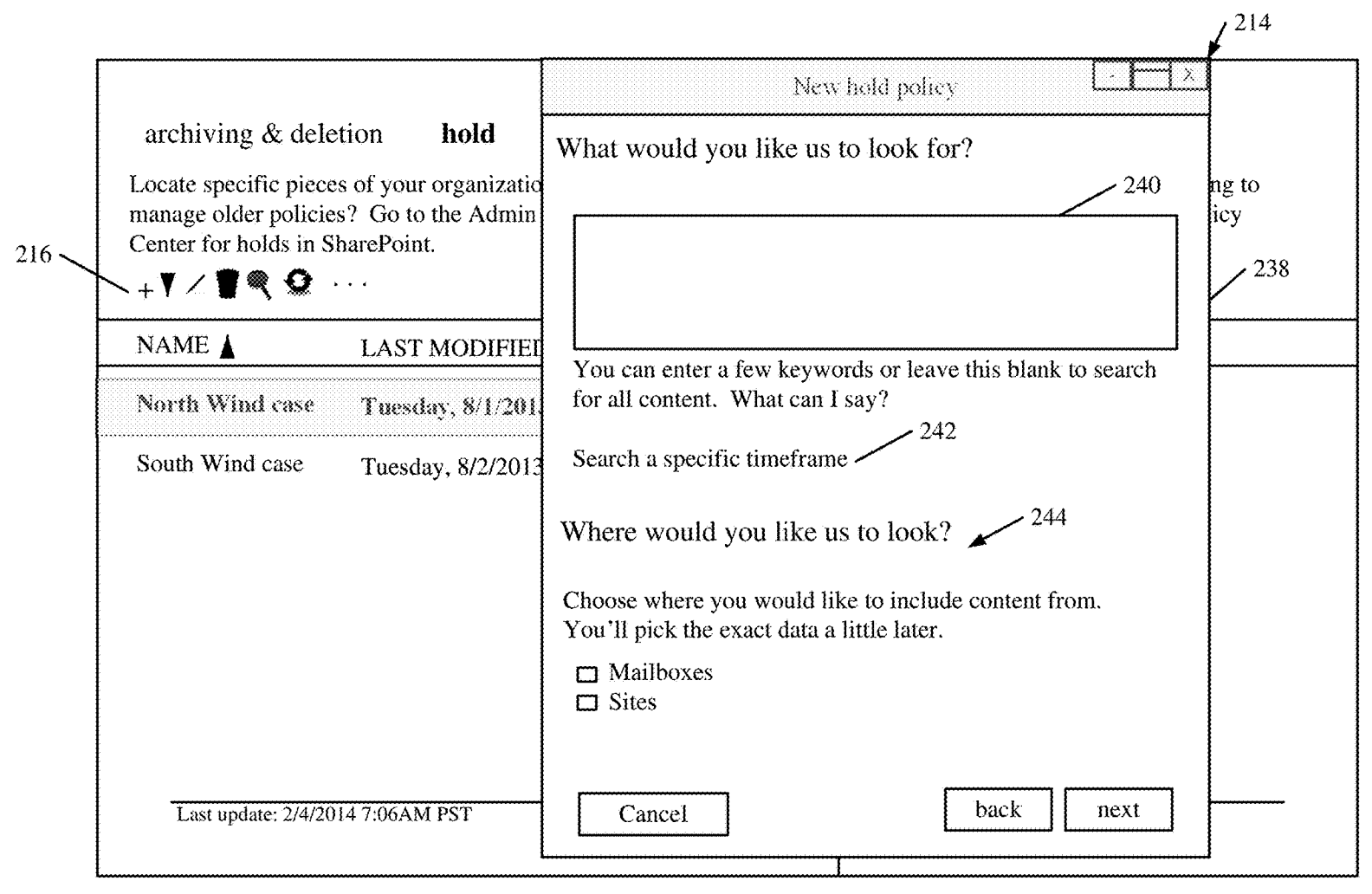

FIG. 3D shows an example of a user interface display 214, where pop-up display 238 has been generated. It can be seen that pop-up display 238 allows the user to enter keywords into a text field 240. In that case, these keywords will be a condition for the compliance policy. That is, content being analyzed must contain the keywords in order for the policy to apply.

FIG. 3D also shows that a timeframe mechanism 242 is displayed, which allows user 150 to specify a timeframe for content, as a condition for the application of this policy. It also includes a location mechanism 244 that allows user 150 to specify a location of the content to be analyzed for this policy (such as certain mailboxes, sites, etc.).

Figure 3E:
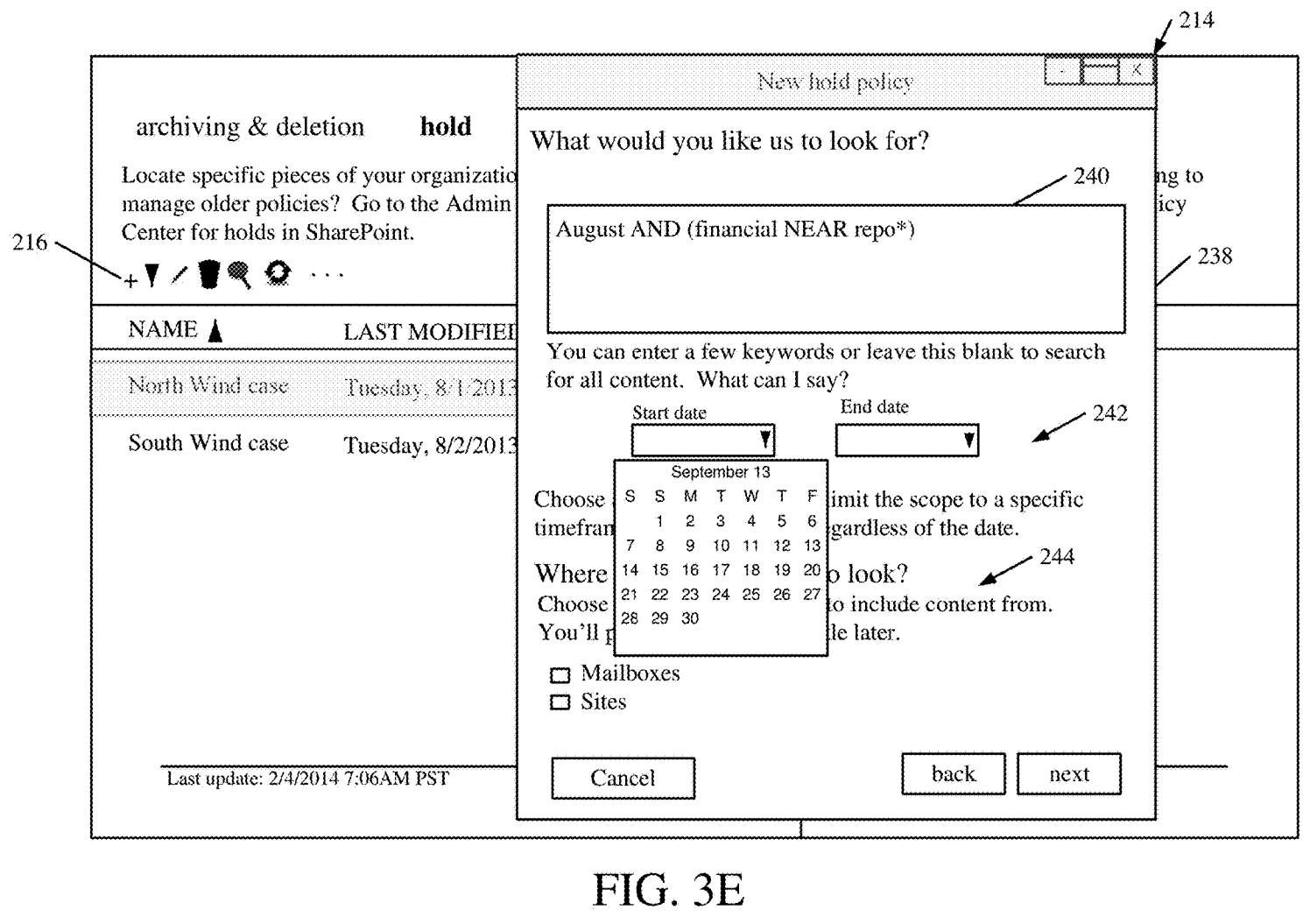

FIG. 3E shows another user interface display that indicates that the user has entered the keywords "August" and "financials near repo*" in the keyword text box 240. Thus, for the current compliance policy to be applied to any content, the content must include the keywords "August" and the term "financials" in close proximity to the term "repo*". FIG. 3E also shows that the user has actuated the timeframe user input mechanism 242. Thus, policy condition component 188 illustratively generates a date picker user interface display such as that shown in FIG. 3E, that allows the user to pick a start and/or end date of the content. Thus, if content is dated within the range of dates specified by the start and/or end dates, the condition will be satisfied.

Figure 3G:
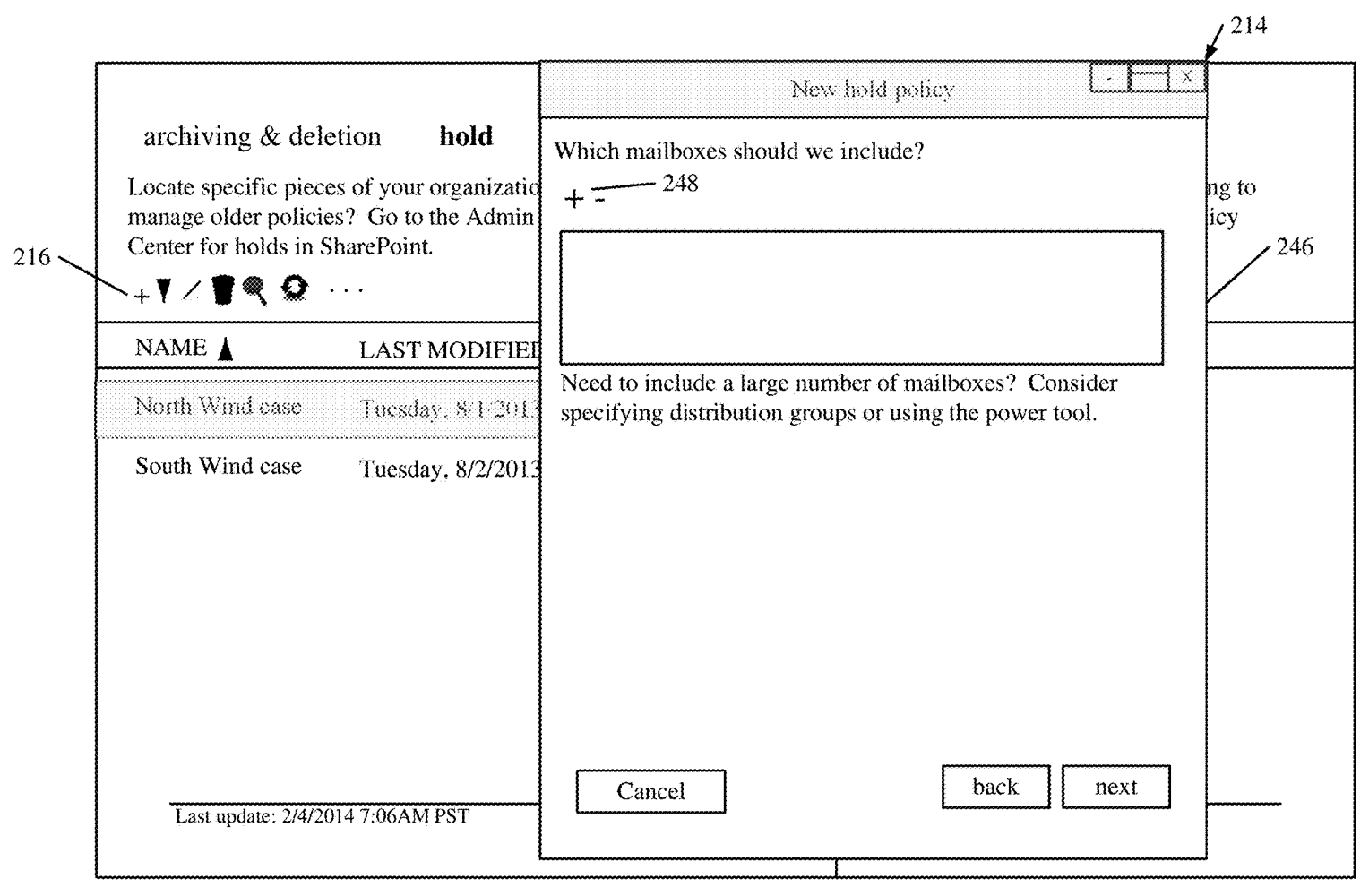

FIG. 3F shows another embodiment of user interface display 214. In FIG. 3F, it can be seen that the user has now also indicated that he or she also wishes to specify certain mailboxes and sites for application of the currently authored compliance policy. The user can then actuate next button 226. In that case, FIG. 3G shows that policy binding component 190 can generate another display 246. It allows user 150 to bind the policy to content that is located in certain locations. In the example shown in FIG. 3G, pop-up display 246 allows user 150 to choose certain mailboxes to which the compliance policy is to be applied. By actuating the add mechanism 248, user 150 can illustratively see a set of e-mail addresses to select from. One example of this is indicated in FIG. 3H.

Figure 3H:
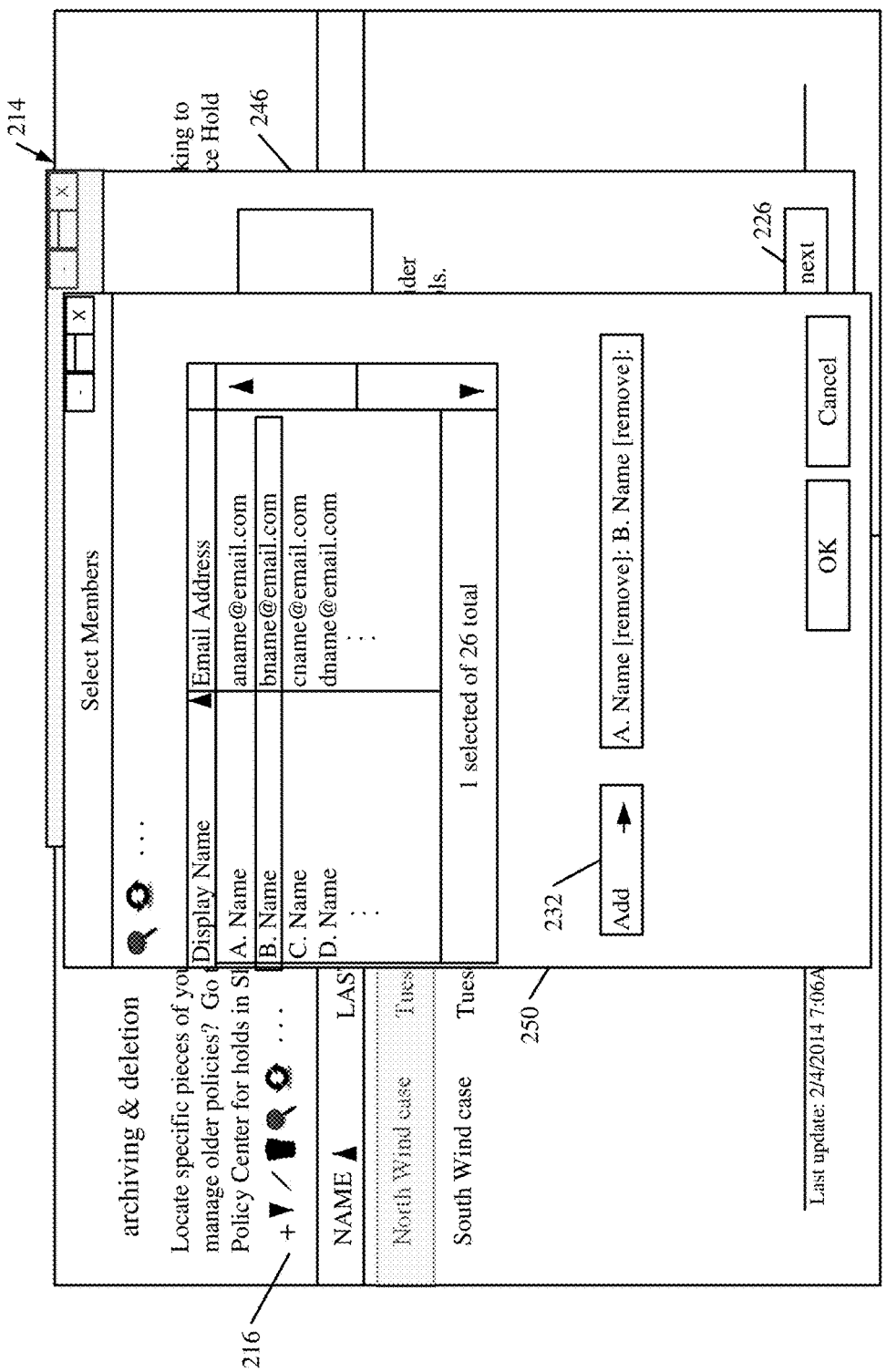
Figure 3I:
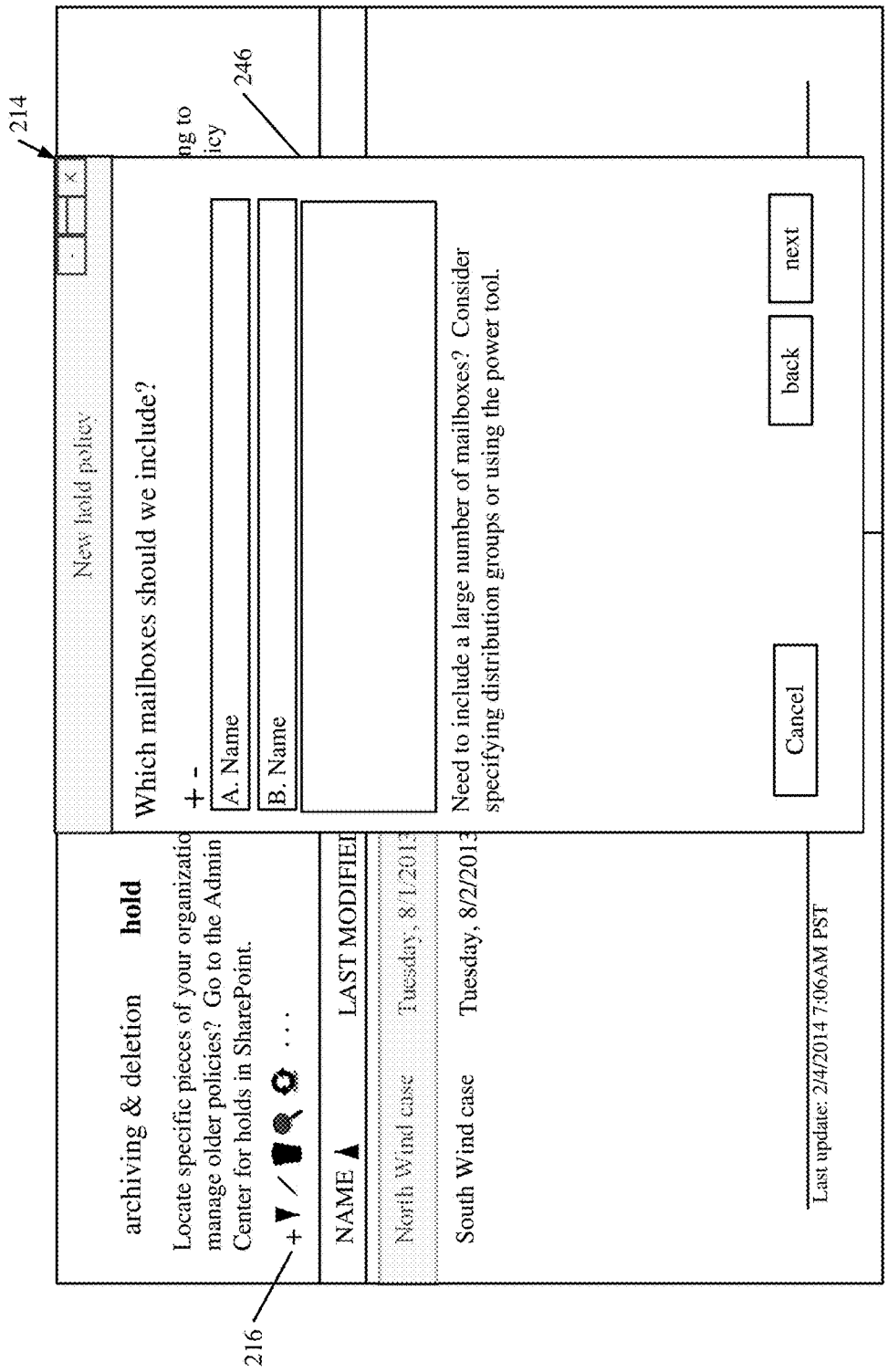

It can be seen in FIG. 3H that the system has now displayed a set of e-mail boxes 250 that can be selected by user 150. User 150 can select from the list shown in pop-up display 250 and actuate add button 252 to add those e-mail boxes to the list of e-mail boxes where the currently-authored compliance policy will apply. FIG. 3I shows another example of pop-up display 246 which now contains the electronic mailboxes that were chosen by the user in FIG. 3H.

Figure 3J:

In one example, user 150 can also include distribution lists, along with or instead of individual e-mail boxes. FIG. 3J shows an example of pop-up display 246 where the user has selected not only the two e-mail addresses shown in FIG. 3I, but also the "Human Resources" distribution list.

Figure 3K:
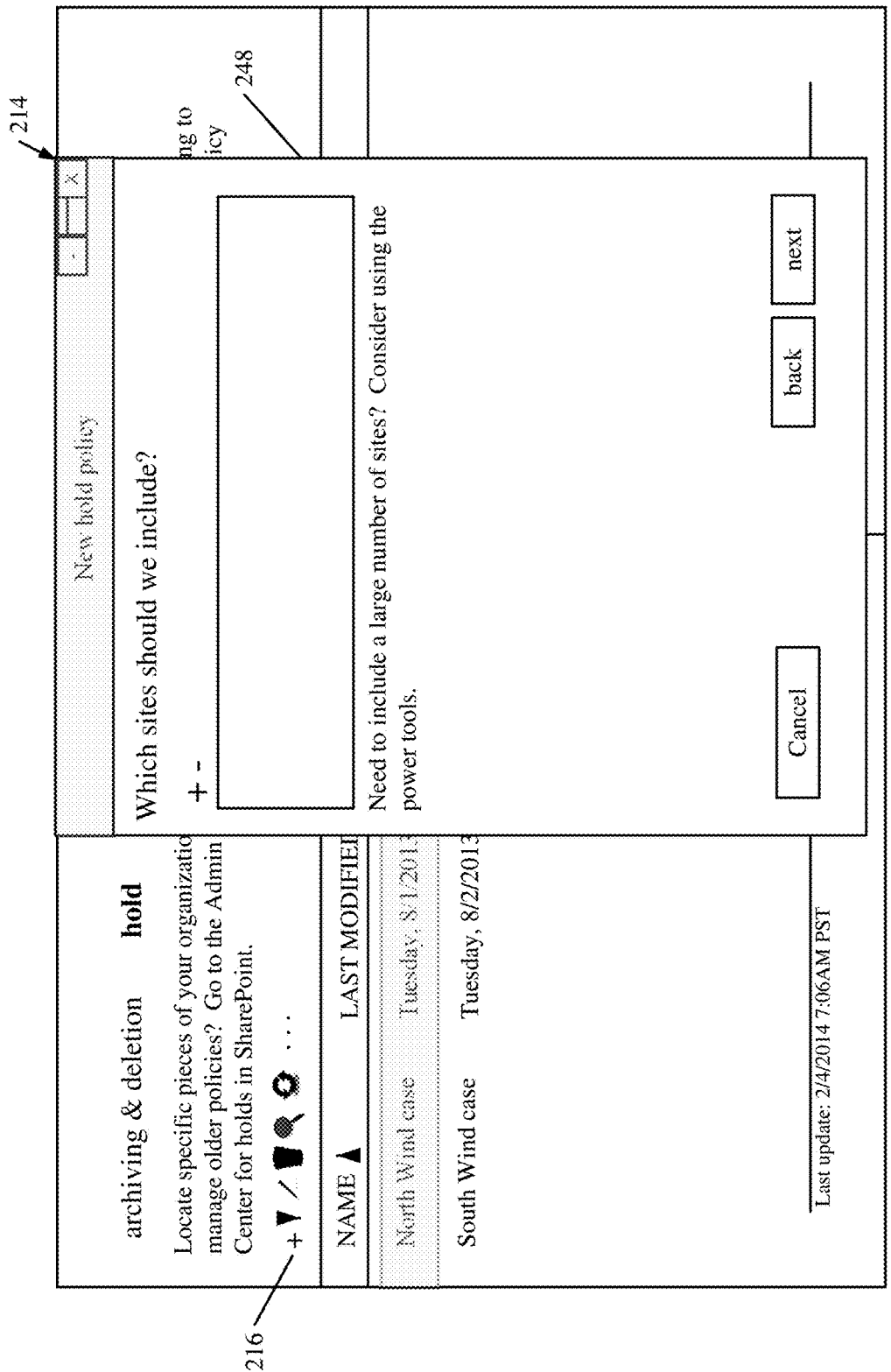
Figure 3L:
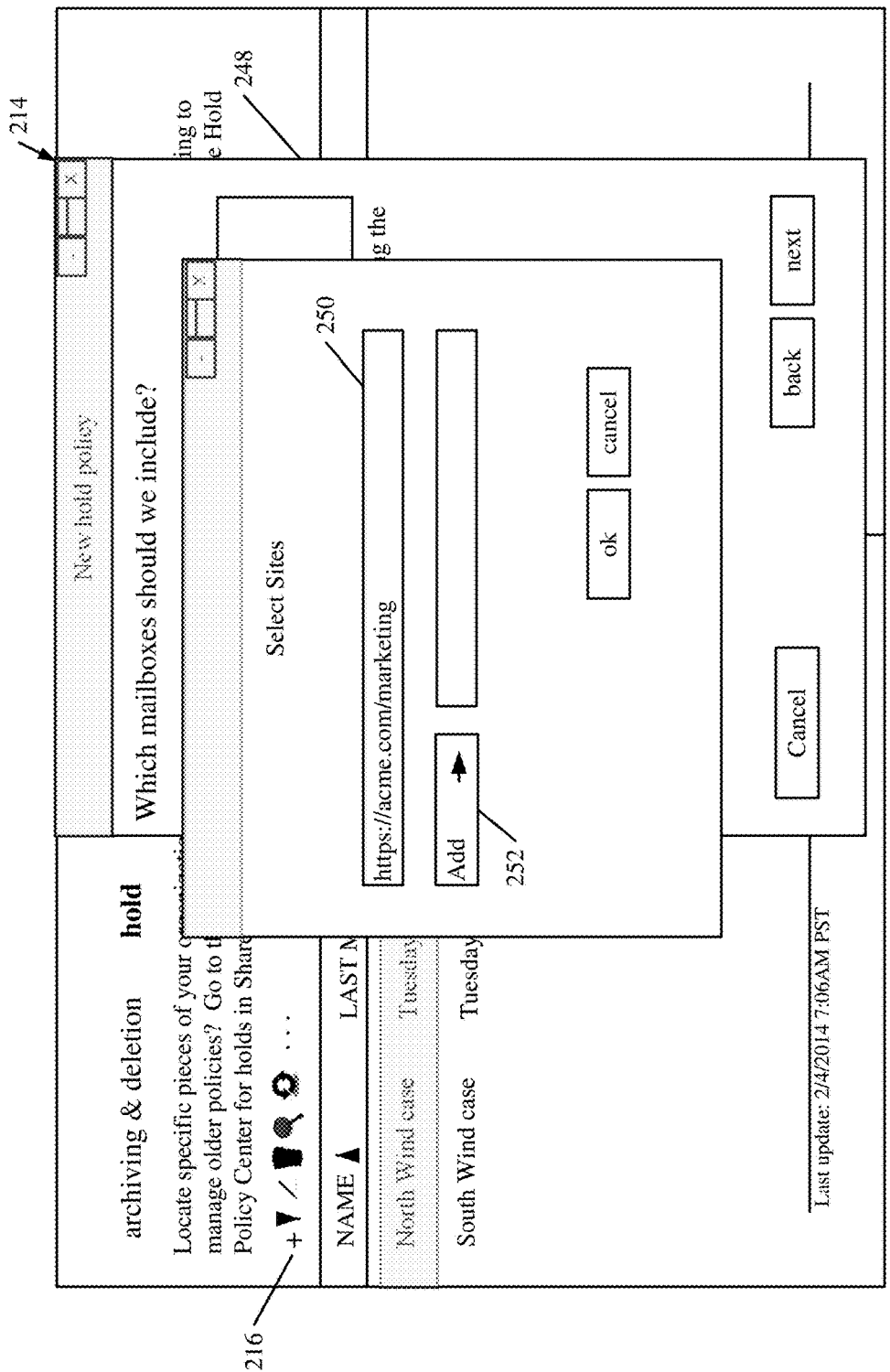
Figure 3M:
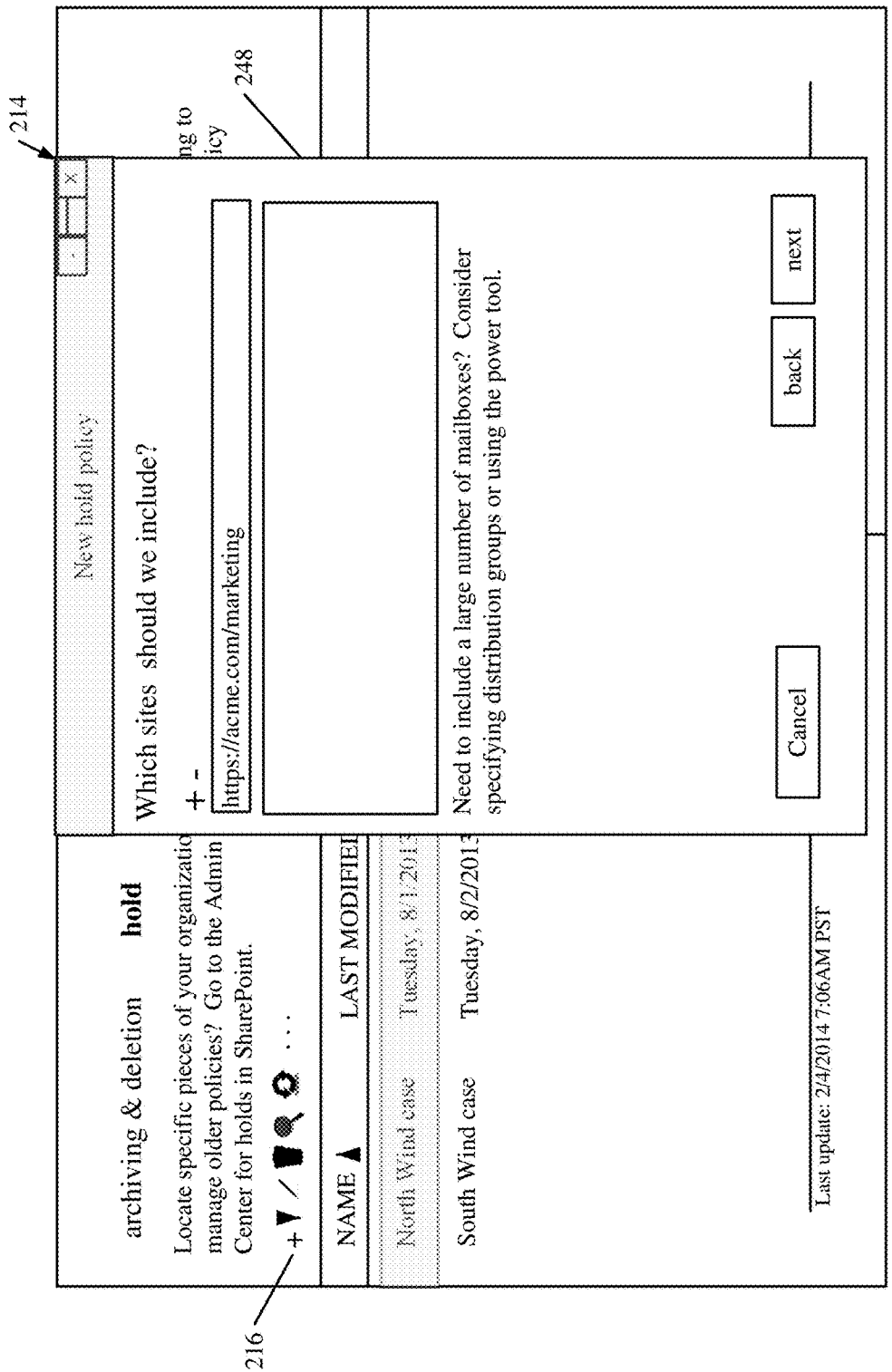

FIG. 3K shows that policy binding component 190 can also generate a similar user interface display 148 that allows the user 150 to select other locations (such as sites) for application of the policy. FIG. 3L shows that the user can add sites by typing them into selection box 250 and actuating add mechanism 252, or by adding them in other ways. FIG. 3M shows pop-up display 248 after the user has selected a site where the new compliance policy is to be applied.

Referring again to the flow diagram of FIG. 3, receiving the user inputs that define conditions and scoping of the compliance policy is indicated by block 254.

Policy action component 192 (shown in FIG. 2) then generates user interface displays that allow user 150 to specify actions that are to be taken when the compliance policy is triggered. This is indicated by block 256. The particular actions may be dependent on the particular scenario for which the compliance policy is generated. By way of example, if the compliance policy is a hold policy, then the actions may indicate how long the content is to be held, whether and under what conditions they can be deleted, etc. However, if the compliance policy is a security policy, it may indicate what types of content are to be encrypted prior to being sent with a messaging system. A wide variety of other actions can be defined as well.

Figure 3N:
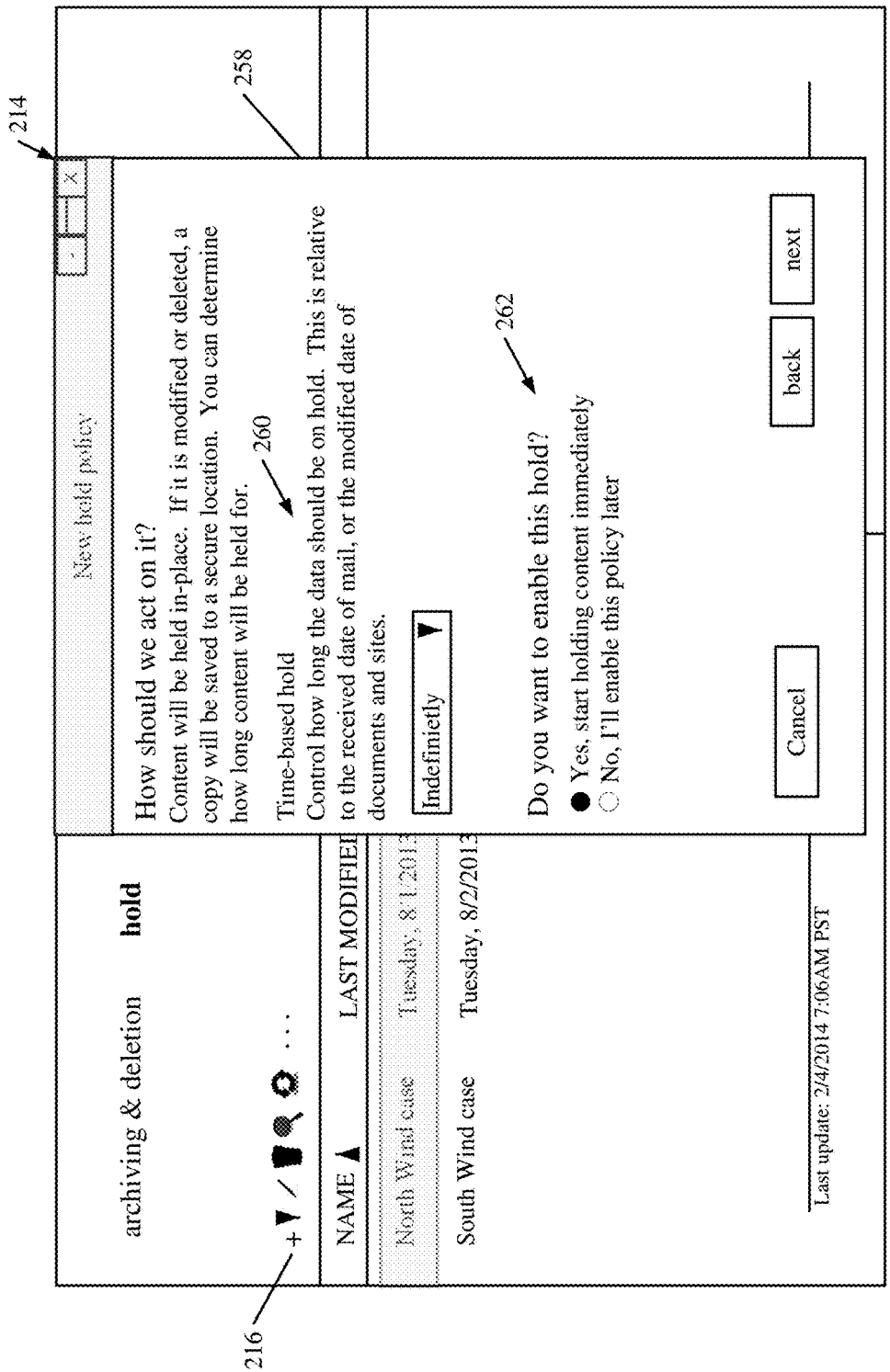

FIG. 3N shows one example of a pop-up display 258 that allows user 150 to specify actions for a hold policy. Display 258 illustratively includes a time-based hold mechanism 260 that allows user 150 to specify a time that content is to be held. Enablement mechanism 262 allows user 150 to specify when the hold policy is to take effect.

Figure 3O:
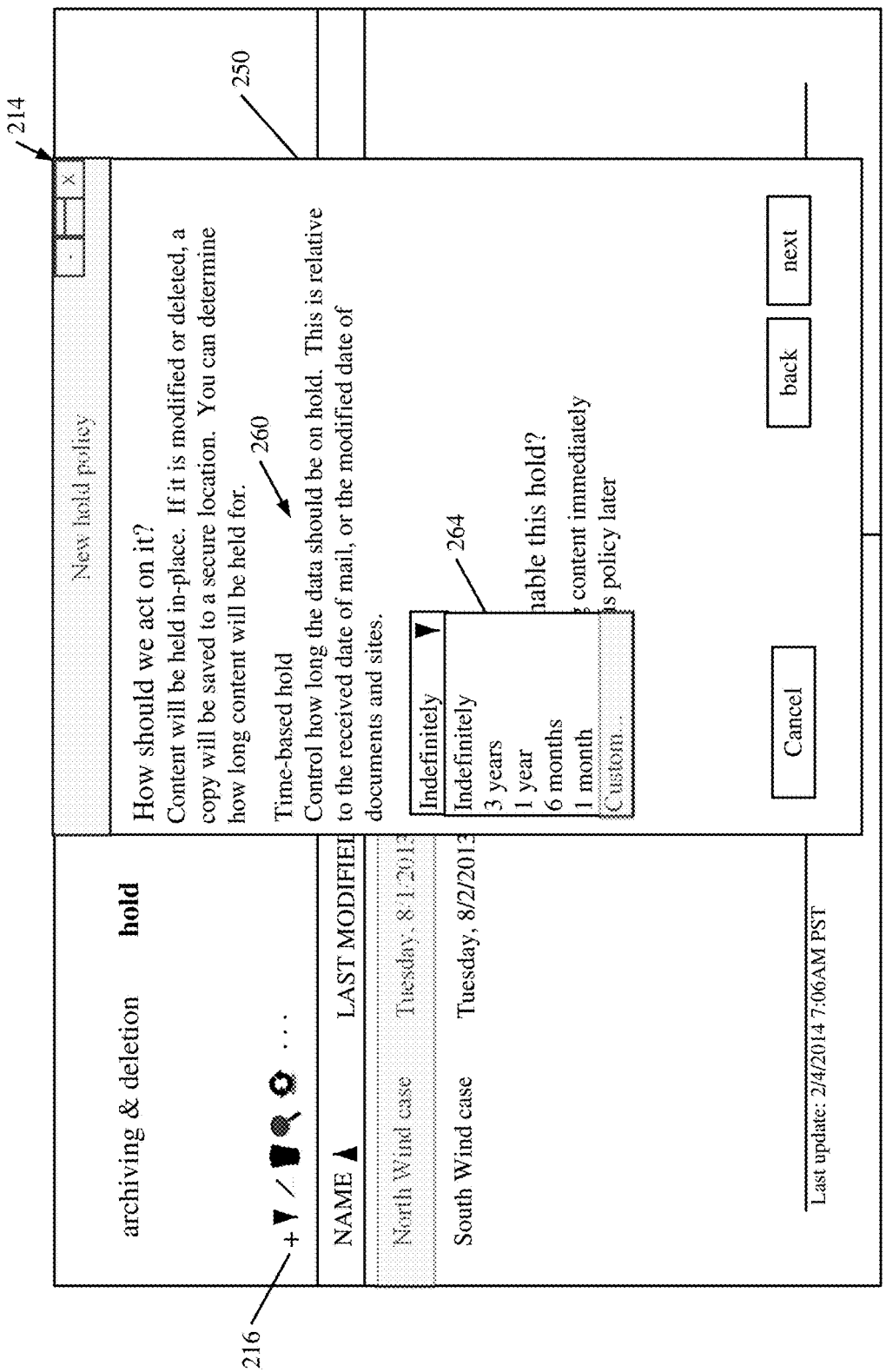
Figure 3P:
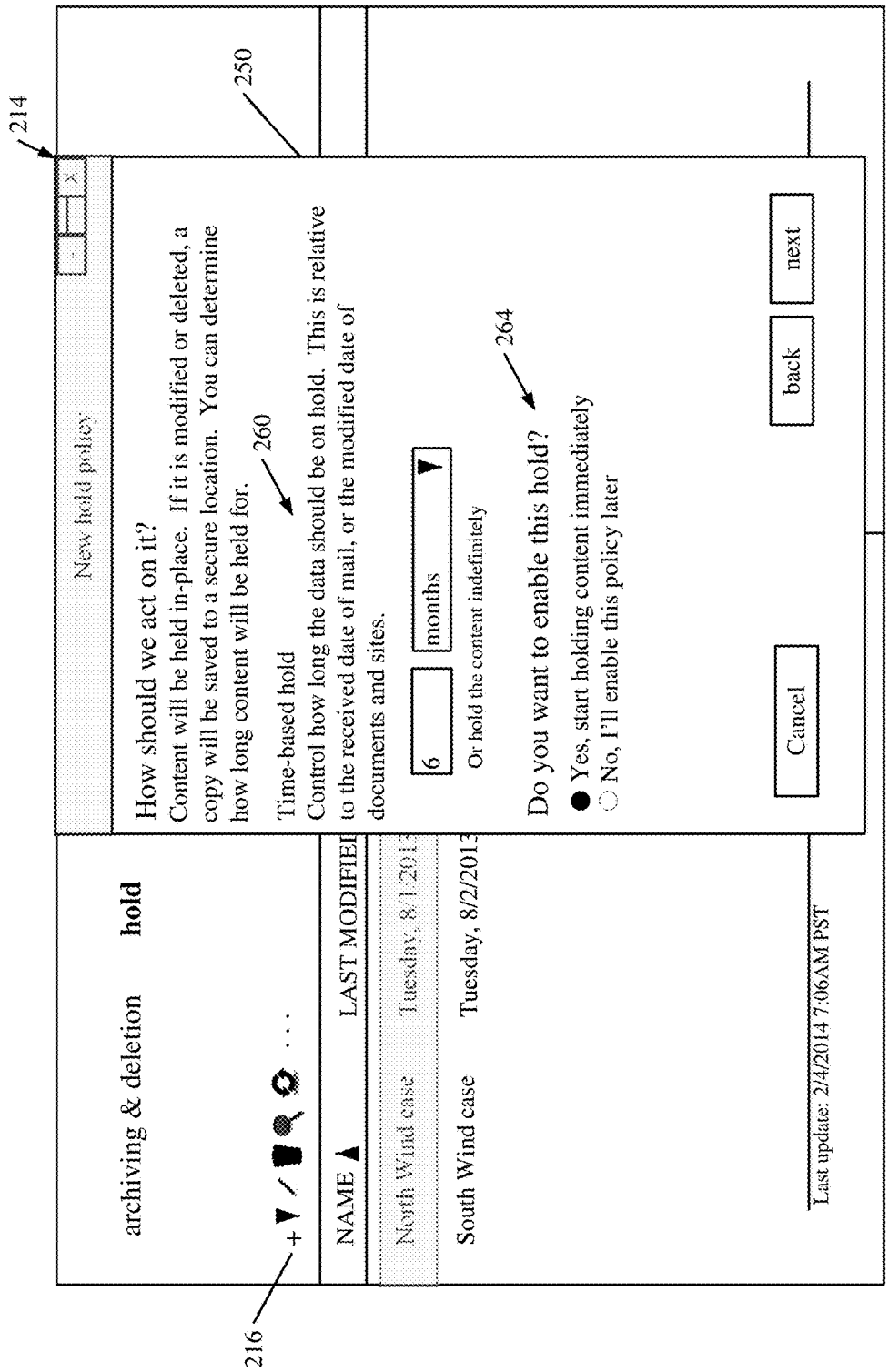
Figure 3Q:
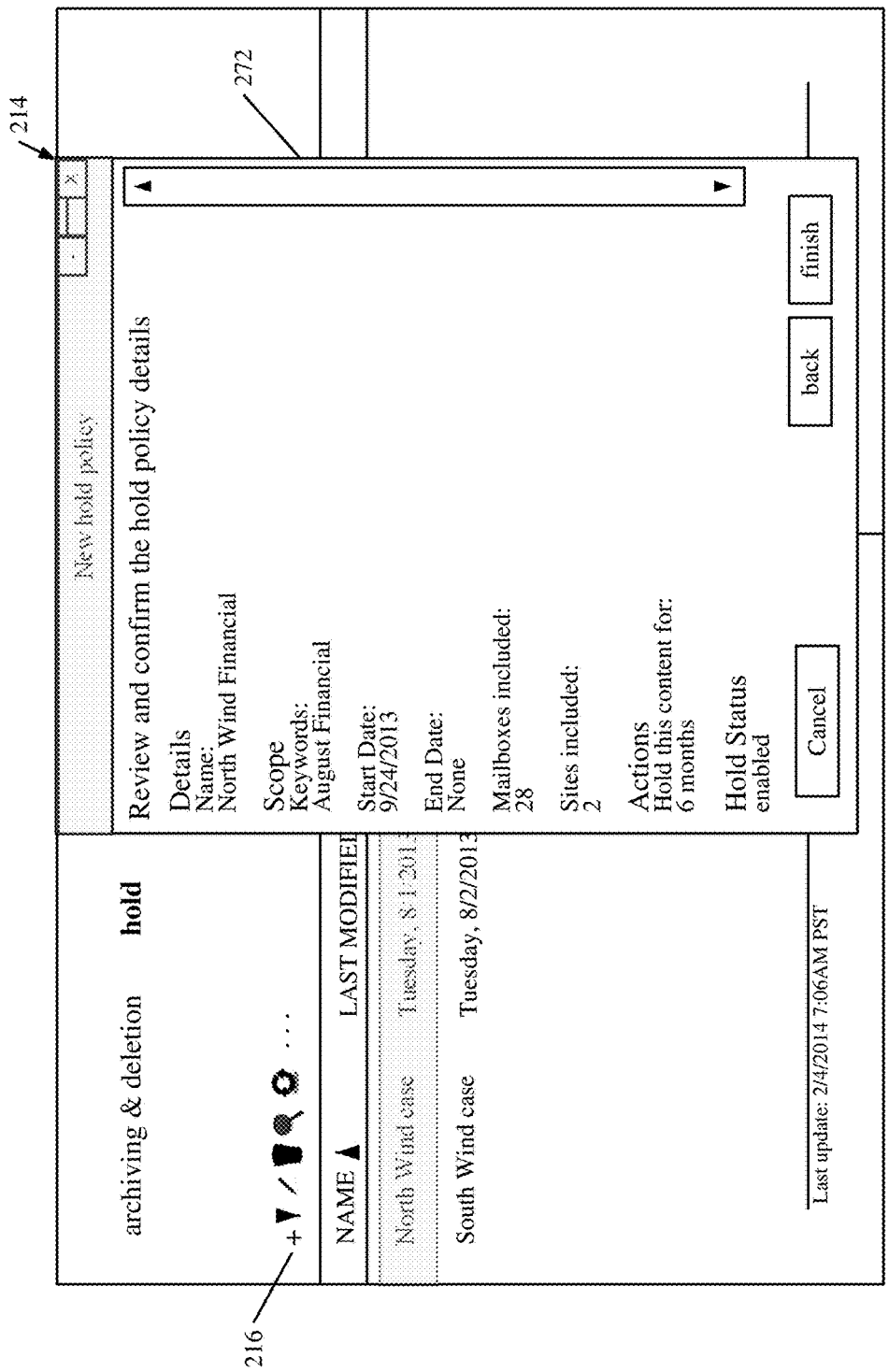

FIG. 3O shows one example of user interface display 250 where the user has actuated the time-based hold mechanism 260. It can be seen that policy action component 192 then generates another display 264 that allows user 150 to identify a certain period of time to hold the contents that are analyzed using the compliance policy. FIG. 3P illustrates that the user has provided inputs indicating how long to hold the content (6 months) and when to enable the policy (immediately). Referring again to the flow diagram of FIG. 3, receiving user inputs defining policy actions is indicated by block 270.

It will be noted that, in one example, at any time, the user can review and confirm the policy details that have just been input. FIG. 3Q shows one example of a policy detail display 272. It can be seen that policy detail display 272 includes the various details of the policy that has just been configured.

Once the policy is adequately defined by the user, the user can provide an input to deploy the policy. This is indicated by block 276 in the flow diagram of FIG. 3. When that occurs, schema generator component 184 generates a representation of the newly authored compliance policy according to a unified schema that is unified across all of the various workloads to which compliance policies are to be applied. This is indicated by block 278 in FIG. 3.

Table 2 shows one example of a policy configuration object schema that represents a policy. Table 3 shows a markup language representation of the schema. It can be seen in Table 3 that an XML schema expresses a hierarchical relationship of logical conditions. A top level node in the schema shown in Table 3 is referred to as the rule. It expresses a hierarchy of logical nodes of "and" and "or" as well as "not" operators. Each condition inside the node can be a specific point for policy evaluation. Table 3 also shows the schema for representing actions indicated in the rule. This can easily be extended by including new tags in the schema to represent new conditions, and new nodes in the action schema to represent workload-specific actions (like encryption, etc.)

TABLE 2

| ATTRIBUTE | TYPE | DETAILS | SEARCHABLE |
| --- | --- | --- | --- |
| DISPLAY NAME | string | Friendly, display name of the policy/rule (required). Unique within a policy | Yes |
| TYPE | Int | Policy or Rule type (required) | Yes |
| SUB-TYPE | Int | Sub type such as Hold, Dlp, and Rention | Yes |
| IDENTITY | string | Unique, immutable identifier for the policy/rule within the tenant scope (required) | Yes |
| PARENT | string | ID of the parent container. Only required for rule type | Yes |
| WORKLOAD | Int (flags) | Flag enum to indicate which workload this policy/rule applies to such as Ex, SP etc. (required) | No |
| MODE | Int | Policy/rule mode: Audit, Enforce etc. (Required) | Yes |
| ENABLED | bool | If a policy is enabled or disabled (Required) | Yes |
| PRIORITY | Int | Priority (only set and required for rule type) | No |
| BINDINGS | ICollection<string> | A collection of binding Ids | Yes |
| ASSOCIATIONS | ICollection<string> | A collection of association Ids | Yes |
| RAWCONTENT | string | Raw XML of the policy/rule data (required for rule type and optional for policy type) | No |

TABLE 3

```
<rule name="Policy1" mode="Audit" enabled="true"
activationDate="01/01/2013"
expiryDate="01/01/2014">
    <version requiredMinVersion="15.0.3.1">
        <!-- tags are used to connect individual rules to a Policy-->
        <tags>
            <tag name="bf418349-a5dd-4ae5-b595-9af96bc48aa6" type="CP"
            />
        </tags>
        <condition>
            <and>
                <!-- Predicate elements, see next condition for an example -->
                <PredicateName property="PropertyName">
                    <Values>
                        <Value>Value - specific for a condition type</Value>
                    </Values>
                    <keyValues>
                        <keyValue key="specific for condition type" value="10"
                        />
                        <keyValue key="maxCount" value="-1" />
                    </keyValues>
                </conditionName>
                <!—Example: ExceptIfFromMemberOf predicate -->
                <not>
                    <or>
                        <isMemberOf property="Message.From">
                            <value>testd1@acme.com</value>
                            <value>testdl2@acme.com </value>
                        </isMemberOf>
                    </or>
                </not>
            </and>
        </condition>
        <!—Action schema, see next action for an example -->
        <action name="ActionName">
            <!— arguments are positional parameters -->
            <argument value="action-specific value" />
        </action>
        <!— -SenderNotify RejectUnlessExplicitOverride action -->
        <action name="SenderNotify">
            <argument value="RejectUnlessExplicitOverride" />
            <argument value="550" />
            <argument value="5.7.1" />
            <argument value="Unable to deliver your message. You can
override this policy by adding the word 'override' to the subject line." />
        </action>
    </version>
</rule>
```

Once the user provides an input to deploy the policy, then policy distribution system 154 (shown in FIG. 4) deploys the unified representation of the policy to the relevant workloads 106-108. This is indicated by block 280 in FIG. 3.

Figure 4:
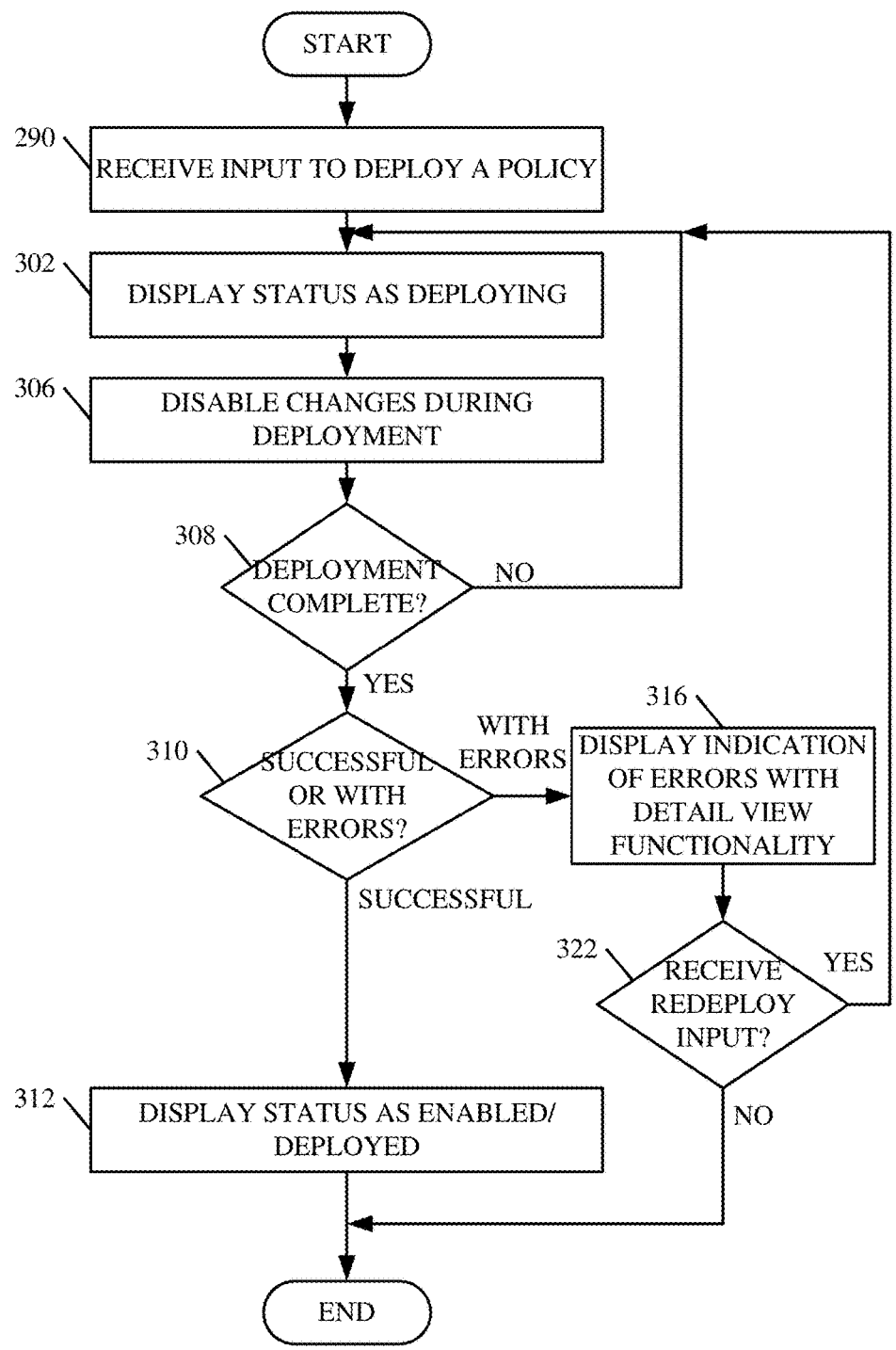
FIG. 4 is a flow diagram illustrating one example of the operation of the architecture shown in FIG. 1 in deploying a compliance policy update.

FIG. 4 is a flow diagram illustrating one example of how a policy is deployed, in more detail. FIGS. 4A-4F show examples of user interface displays.

It is first assumed that the user has already defined one or more policies that the user wishes to deploy to various workloads. User 150 then provides an input using a user input mechanism that indicates that user 150 wishes to deploy the policies to the workloads. Receiving an input to deploy a policy is indicated by block 290 in FIG. 4.

Figure 4A:
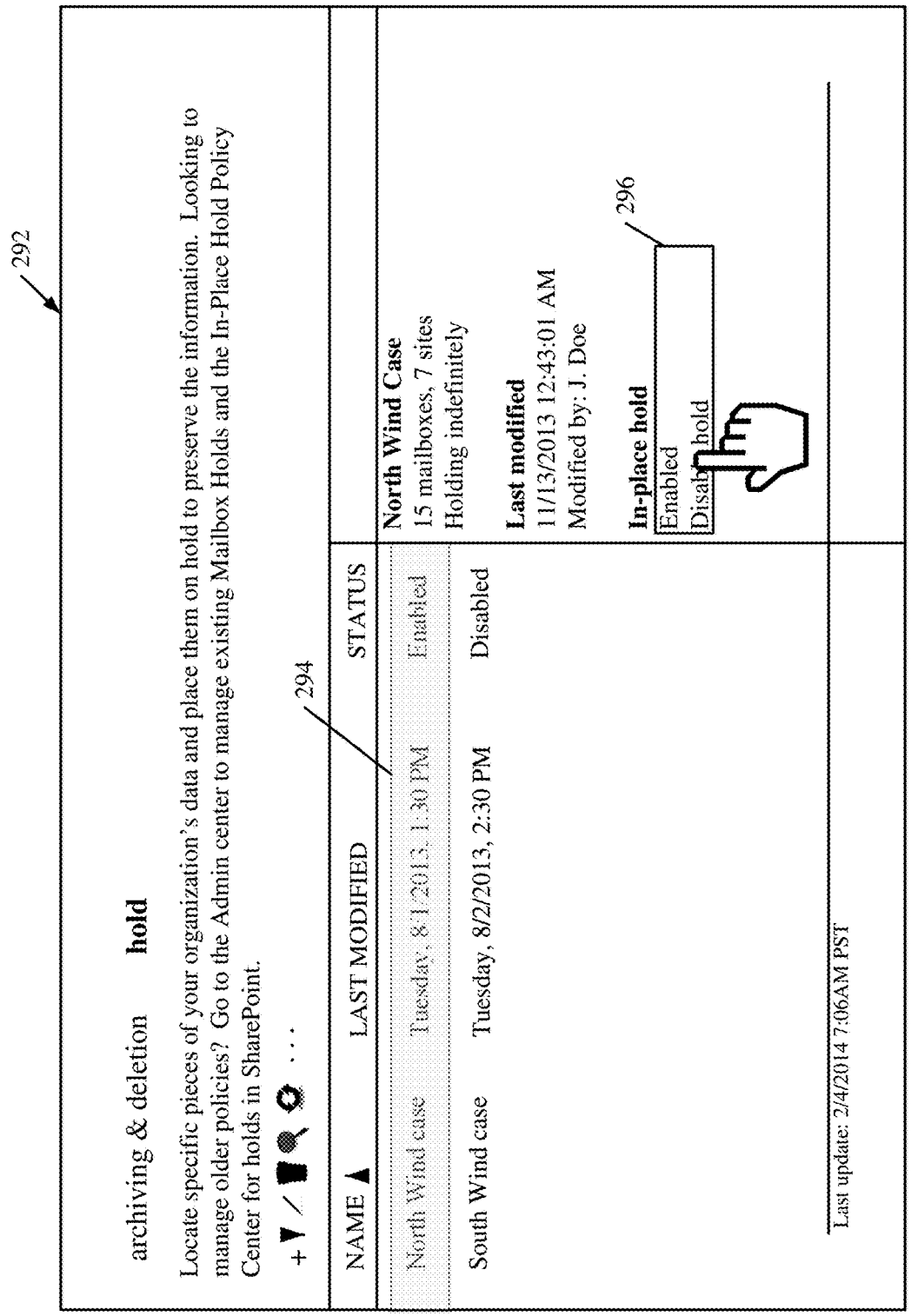
Figure 4B:
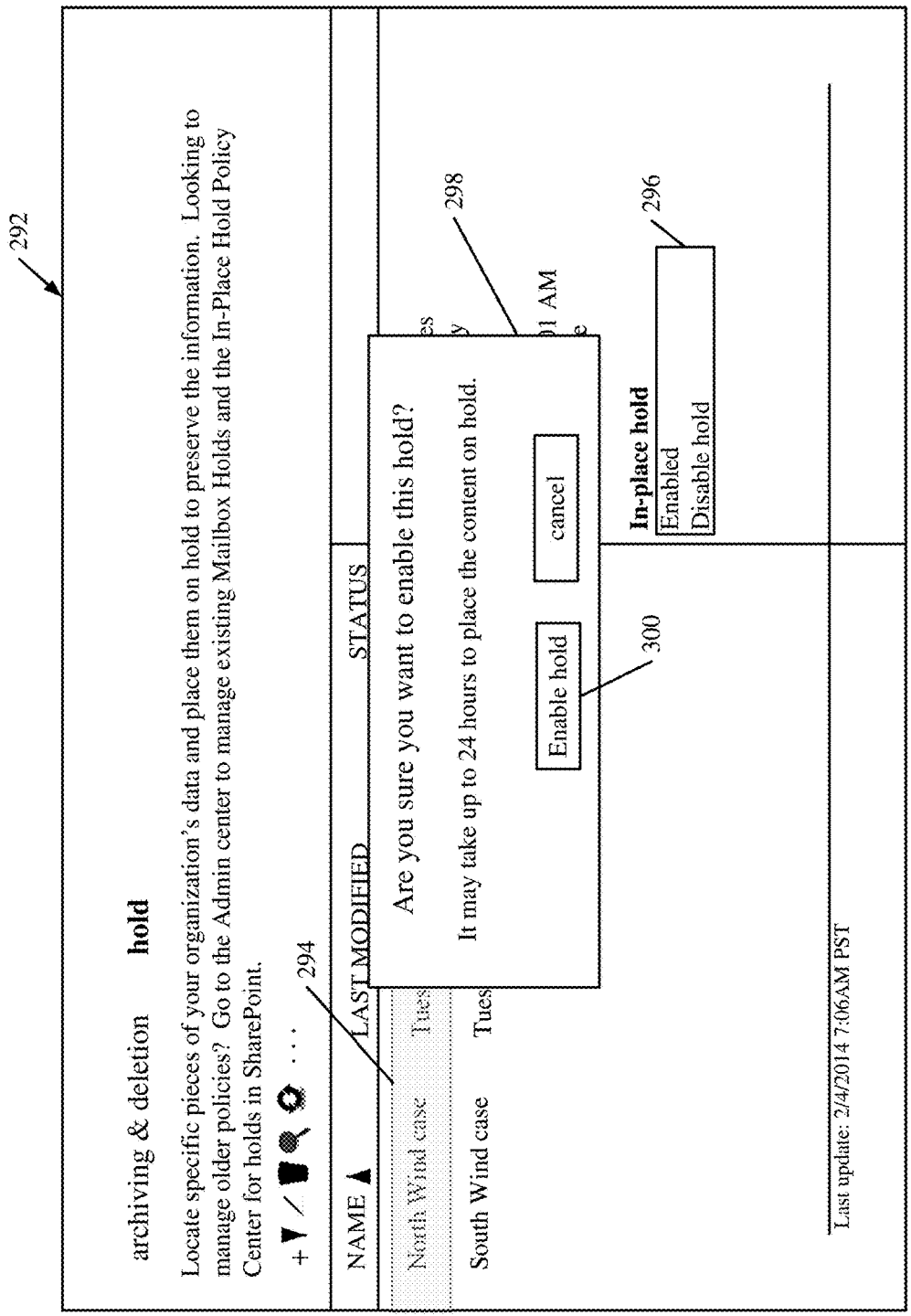

FIG. 4A shows one example of a user interface display 292 that indicates this. User interface display 292 shows that user 150 has selected the policy that has already been generated, and is indicated by the highlighted selection 294. User 150 then actuates an enable/disable user input mechanism 296. This indicates that the user wishes to change the enable/disable status of the selected policy 294. Policy distribution system 154 (shown in FIG. 1) then generates another user interface display that illustratively allows user 150 to confirm that he or she wishes to enable the highlighted policy 294. FIG. 4B is an example of a user interface display indicating this. It can be seen that user interface display 292 is similar to that shown in FIG. 4A, except that the confirmation dialog 298 is now displayed. It has a user input mechanism 300 that allows user 150 to confirm that the selected policy 294 is to be enabled.

Policy distribution system 154 then begins enabling or deploying the selected policy 294 to the desired workloads 106-108. In doing so, it illustratively generates a user interface display indicating, with a status indicator, that the policy deployment is in progress. This is indicated by block 302 in the flow diagram of FIG. 4, and FIG. 4C shows one example of a user interface display that indicates this. FIG. 4C is similar to the user interface display shown in FIG. 4A. However, FIG. 4C now shows that the status column 304 and the enable/disable mechanism 296 indicate that the selected policy 294 is currently being deployed.

In one example, in order to avoid conflicting changes, policy distribution system 154 disables any further changes by user 150, to the selected policy 294, while it is being deployed. This is indicated by block 306 in the flow diagram of FIG. 4.

It will be noted that a more detailed description of how policies are actually distributed or synchronized down to workloads 106-108 is described below with respect to FIGS. 6-11. Suffice it to say, for now, that a policy can be deployed either with errors or without errors. For example, it may be that a policy is successfully deployed to a certain set of mailboxes, where the workload is an electronic mail system, but it was unsuccessfully bound to another set of mailboxes. In this case, the policy is deployed, but with errors. Determining whether the policy has been completely deployed and determining whether it has been deployed with or without errors is indicated by blocks 308 and 310 in the flow diagram of FIG. 4. If it is deployed successfully (without errors), then policy distribution system 154 generates a user interface display that indicates this. Displaying the status as being enabled or deployed without errors is indicated by block 312 in the flow diagram of FIG. 4.

Figure 4D:
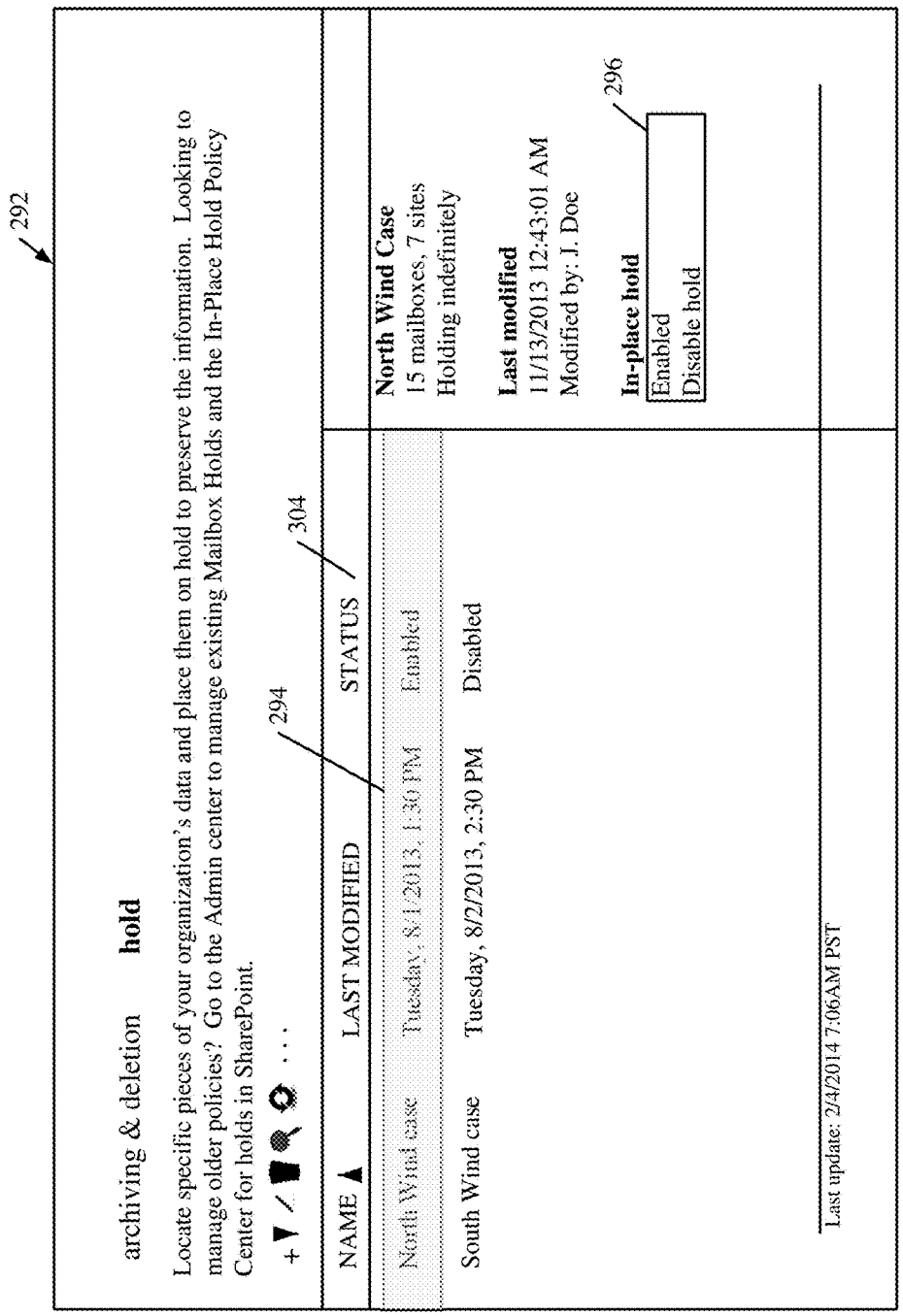

FIG. 4D shows one example of a user interface display that indicates this. The user interface display shown in FIG. 4D is similar to that shown in FIG. 4C except that the status 304 of selected policy 294, and the enable/disable user input mechanism 296, both indicate that the policy is now enabled. They also show that no errors are indicated.

FIG. 4E shows an example of a user interface display that is generated if the policy is deployed with errors. Again, it can be seen that the user interface display shown in FIG. 4E is similar to that shown in FIG. 4D. However, the status 304 of the selected policy 294 now indicates that the policy is enabled with errors. Further, the enable/disable mechanism 296 also indicates that errors occurred. Mechanism 296 includes a details user input mechanism 314 that allows user 150 to drill down to see additional details of the errors. Displaying the indication of errors with the detail view functionality is indicated by block 316 in the flow diagram of FIG. 4E.

Figure 4F:
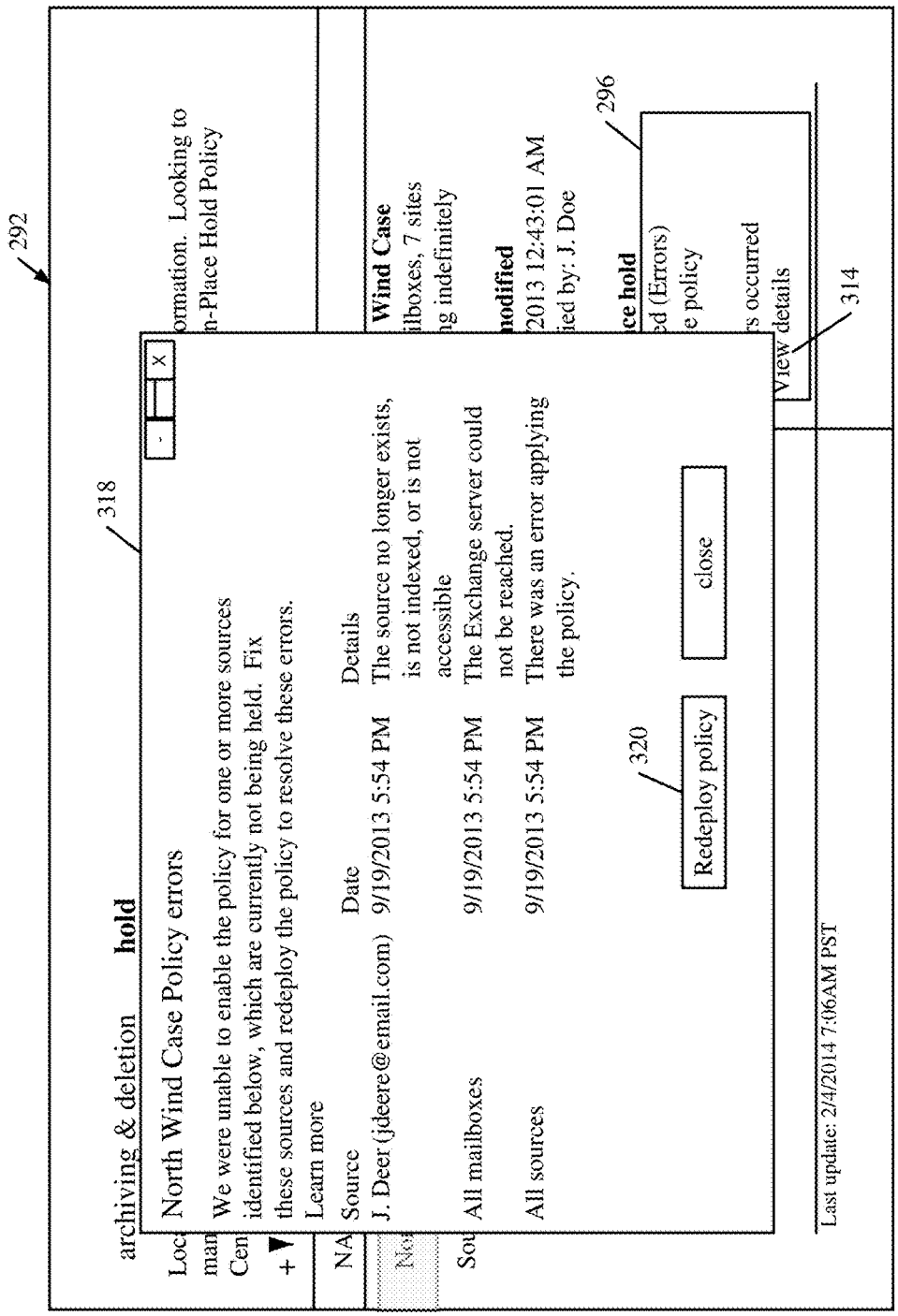

FIG. 4F is another example of a user interface display that is similar to that shown in FIG. 4E. However, FIG. 4F shows that user 150 has actuated the details user input mechanism 314 and a details display 318 is generated. Display 318 describes the errors that occurred. It also includes a redeploy user input mechanism 320. Therefore, user 150 can make modifications to fix the listed errors and actuate user input mechanism 320 to redeploy the policy, if desired. Receiving a redeploy input is indicated by block 322 in the flow diagram of FIG. 4. If that occurs, processing reverts back to block 302 where the policy distribution system 154 again attempts to deploy the policy.

It will be appreciated that a compliance policy can be disabled or deleted as well. In that case, policy CRUD system 152 generates suitable user interface displays allowing user 150 to disable or delete the policy. If the policy is to be disabled, policy distribution system 154 generates user interface displays similar to those shown in FIG. 4A-4F, except that the user inputs will be to disable the policy rather than enable it. In one example, it may take some time to completely disable a policy from workloads 106-108. In that case, the status indicators will indicate that the policy is being disabled, but that it may take a certain amount of time to disable them. All of these examples are contemplated herein.

Figure 5:
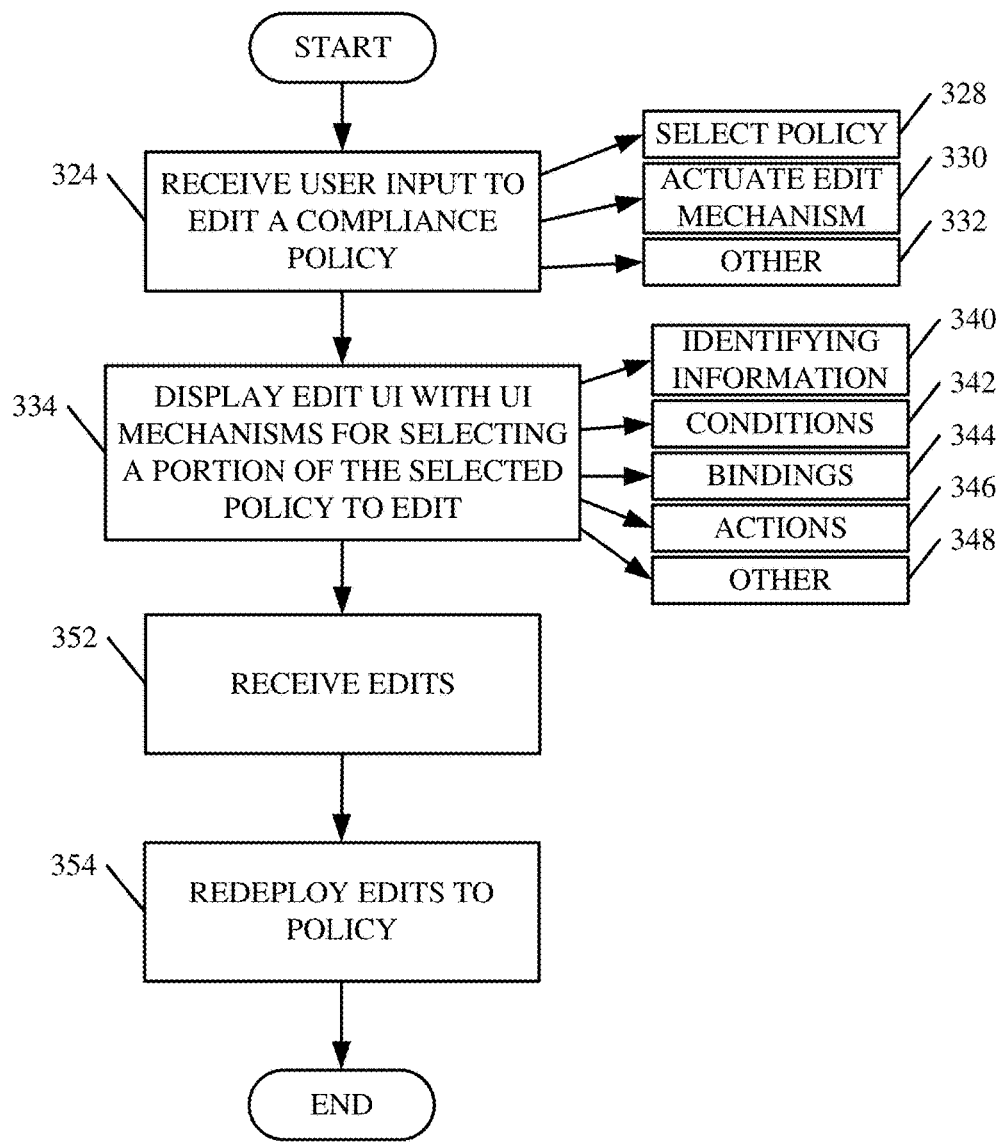
FIG. 5 is a flow diagram illustrating one example of the operation of the architecture shown in FIG. 1 in receiving and deploying an edit to a compliance policy.

It is also contemplated that user 150 may wish to edit an already-existing compliance policy and deploy those changes to the workloads. FIG. 5 is a flow diagram illustrating one example of how user 150 can do this, and FIGS. 5A-5D show examples of user interface displays that can be generated as well.

Policy CRUD system 152 first receives a user input indicating that user 150 wishes to edit an already-existing compliance policy. This is indicated by block 324 in FIG. 5. FIG. 5A shows one example of a user interface display indicating this. It can be seen that FIG. 5A is similar to FIG. 4A, and user 150 has selected compliance policy 294. However, FIG. 5A shows that user 150 is now actuating an edit user input mechanism 326. This indicates that the user wishes to edit the selected compliance policy. Selecting a policy is indicated by block 328 in the flow diagram of FIG. 5, and actuating the edit mechanism 326 is indicated by block 330. User 150 can provide inputs to indicate that the user wishes to edit a compliance policy in other ways as well, and this is indicated by block 332.

Figure 5B:
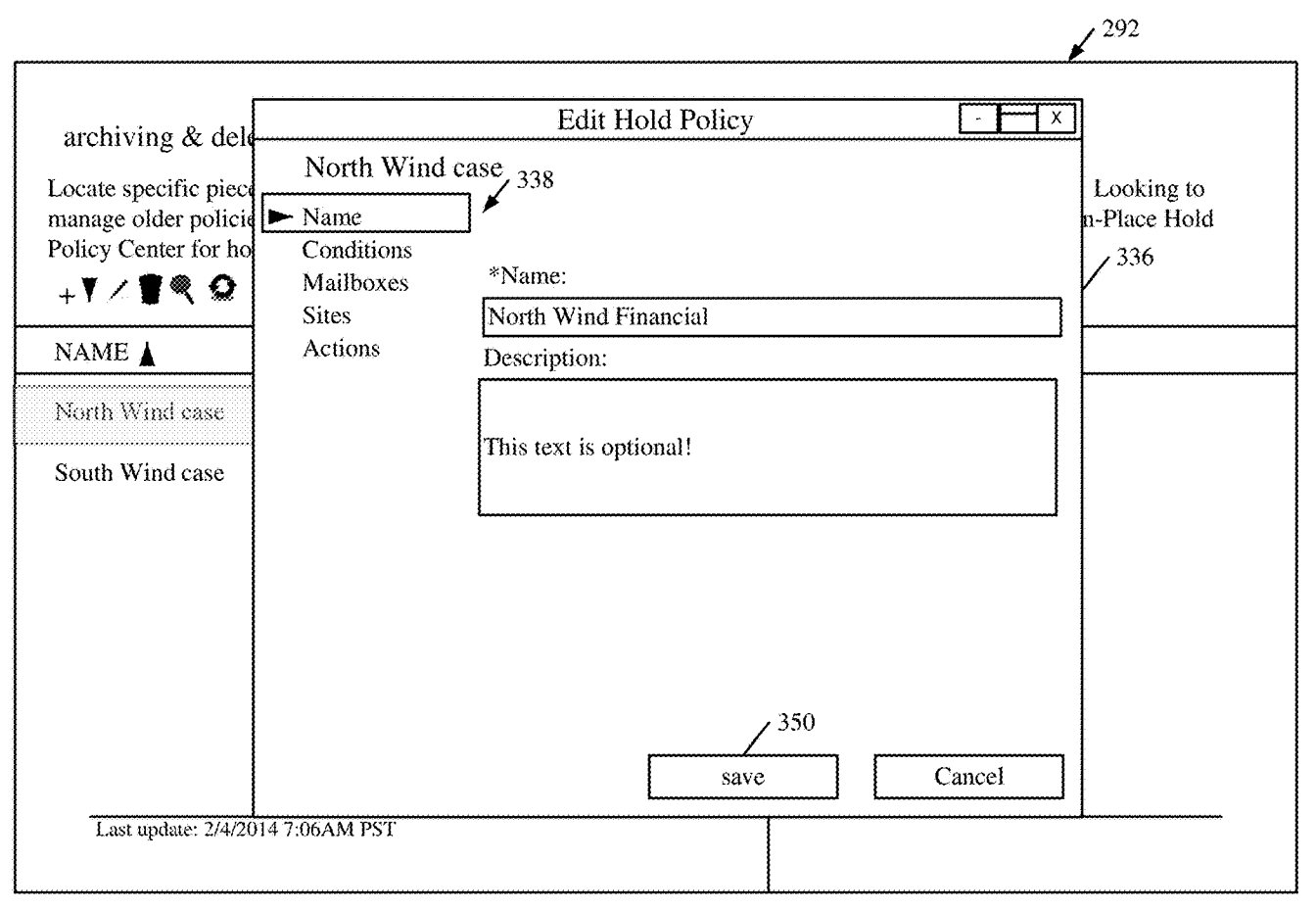

Policy CRUD system 152 then generates an edit user interface display with user input mechanisms that allow user 150 to select a portion of the selected compliance policy to edit. This is indicated by block 334 in the flow diagram of FIG. 5. FIG. 5B shows one example of a user interface display that indicates this. FIG. 5B is similar to that shown in FIG. 5A, except that an edit user interface display 336 is now shown. It illustratively includes a set of selectors 338 that allow the user 150 to select the portion of the compliance policy for editing. In one example, the user can select the identifying information portion of the compliance policy (e.g., the name portion). This is indicated by block 340 in the flow diagram of FIG. 5. The user can also illustratively select the conditions section 342, the bindings section (such as the sites or mailboxes that the compliance policy is bound to) 334, the actions section 346, or other sections 348.

In response, policy CRUD system 152 generates a user interface display that allows user 150 to edit the selected section. It can be seen in FIG. 5B, for instance, that the user has actuated the name user input mechanism. Therefore, policy CRUD system 152 generates user input mechanisms that allow the user to edit the name and description of the compliance policy. The user can then actuate a save user input mechanism 350 in order to save the edits.

Figure 5C:
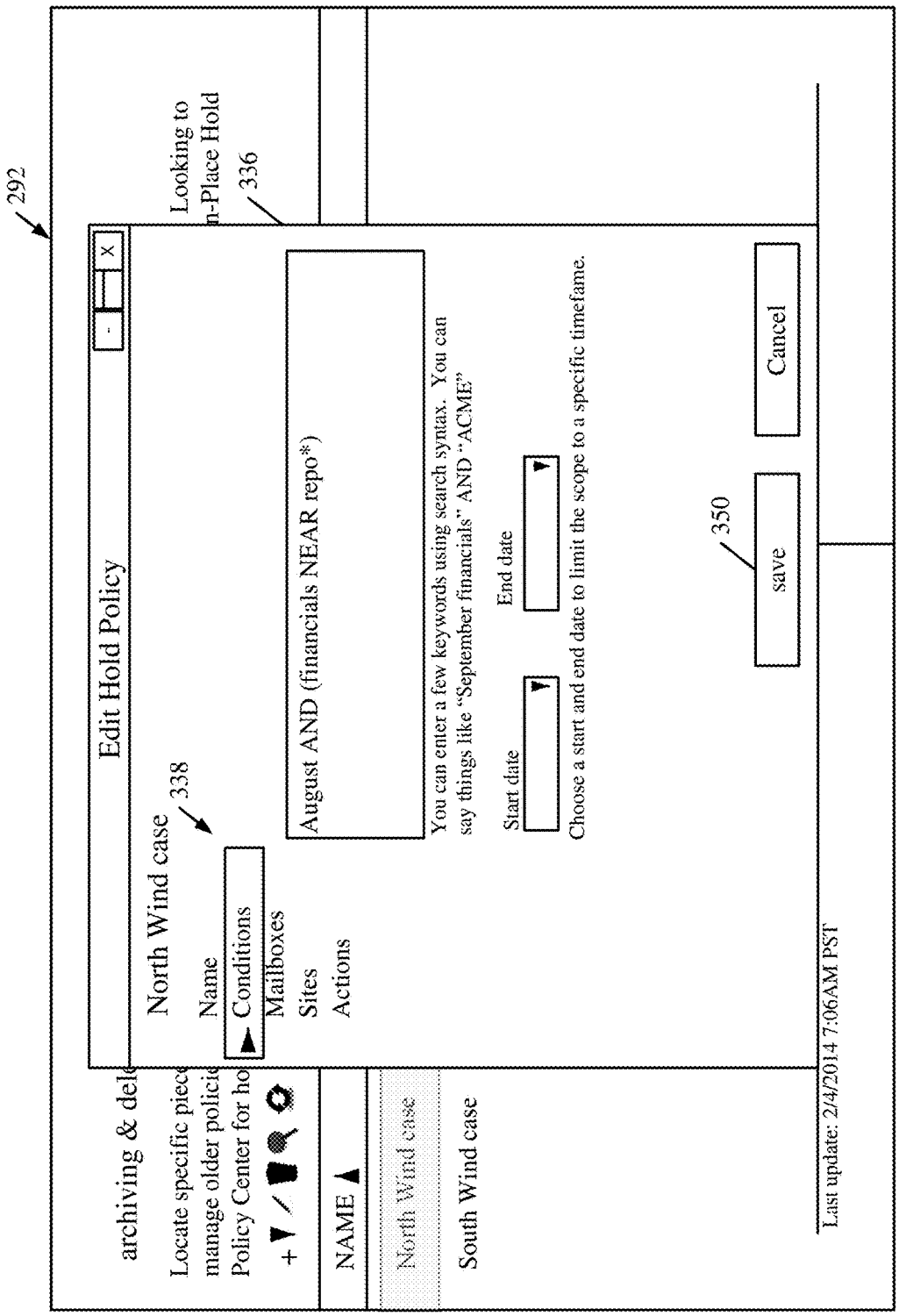

FIG. 5C shows another example of a user interface display where the user has selected the conditions portion of the compliance policy for editing. Policy CRUD system 152 then generates user input mechanisms that allow user 150 to edit the conditions portion of the compliance policy.

Figure 5D:
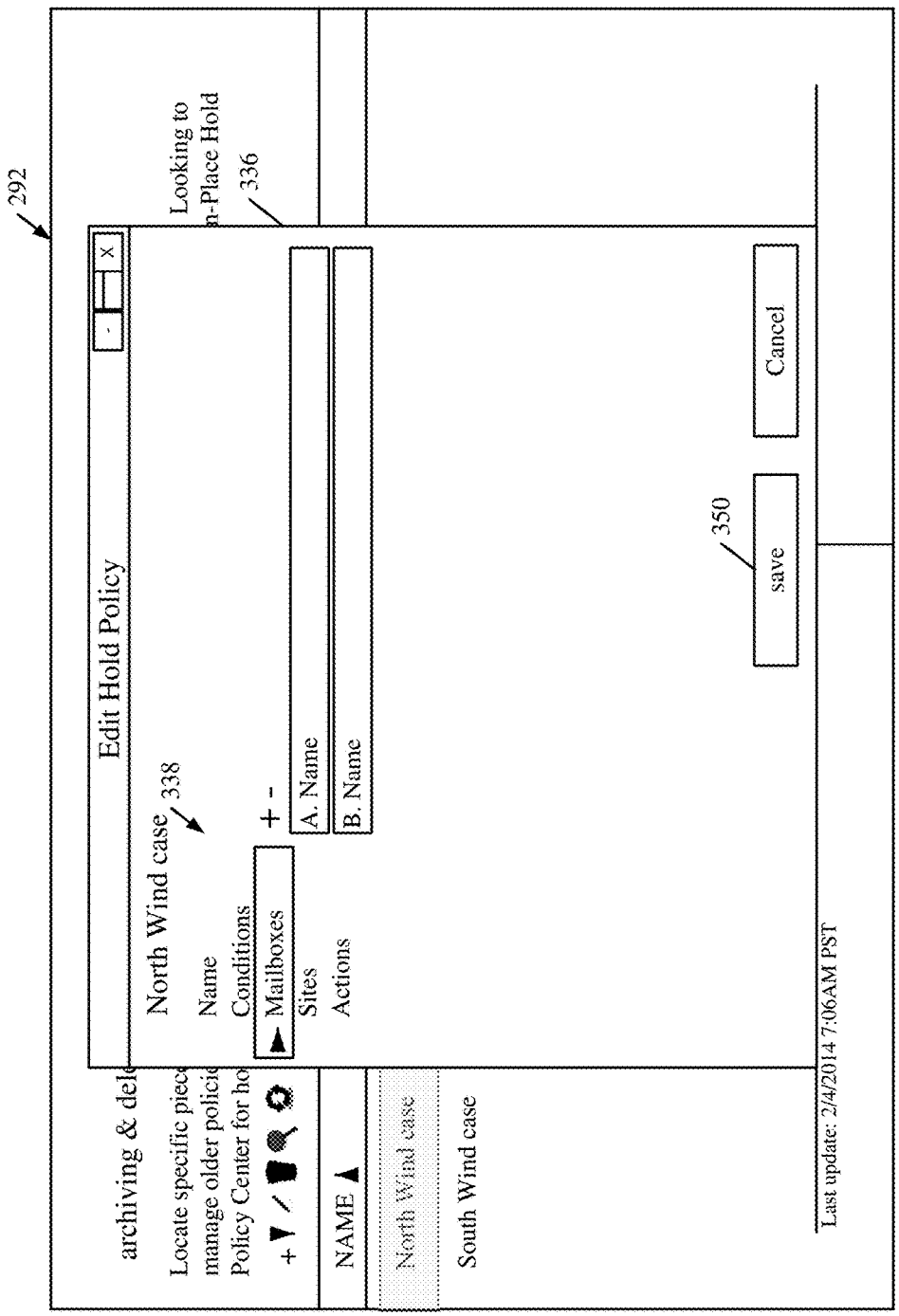

FIG. 5D shows an example of a user interface display where the user has actuated the mailboxes portion of the compliance policy. Therefore, policy CRUD system 152 generates user input mechanisms that allow the user to edit the mailbox bindings for the compliance policy. Similar user input mechanisms as shown if the user selects the site bindings for editing, or the actions portion of the compliance policy for editing.

In any case, user 150 provides edit inputs editing the compliance policy, as desired. Receiving the edits is indicated by block 352 in the flow diagram of FIG. 5. The user then provides a redeploy input (such as actuating save mechanism 350, and actuating a redeploy user input mechanism) in order to redeploy the edits. They are then deployed as described above with respect to FIG. 4. Redeploying the edits to the workloads is indicated by block 354 in FIG. 5.

Figure 6:
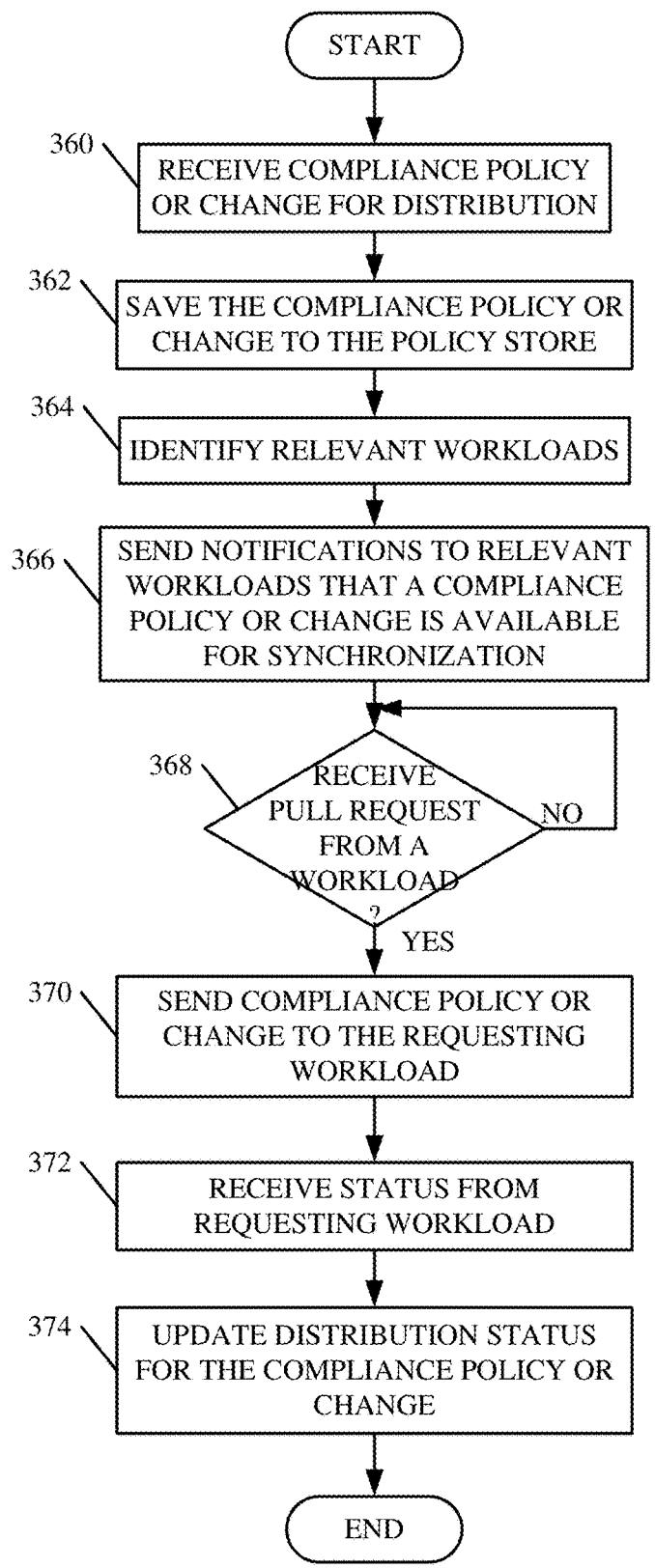
FIG. 6 is a flow diagram illustrating one example of the operation of the architecture shown in FIG. 1 in distributing compliance policies, in more detail.

FIG. 6 is a flow diagram illustrating one embodiment of how a policy is distributed to one or more workloads 106-108, once it has been generated. FIGS. 7-11 describe this in greater detail.

Policy distribution system 154 first receives a policy (or a change to a policy) for distribution to one or more workloads 106-108. In one example, it is received from policy CRUD system 152. Receiving the compliance policy or change (e.g., the updates) for distribution is indicated by block 360 in FIG. 6.

Policy distribution system 154 then saves the update to the central compliance policy store 104. This is indicated by block 362.

Policy distribution system 154 then identifies the relevant workloads 106-108 where the update is to be applied. In doing so, it can illustratively examine the bindings for the policy to see where the compliance policy is bound, and thus the various workloads where it will need to be applied. Identifying these relevant workloads is indicated by block 364.

System 154 then sends a notification to the relevant workloads that a compliance policy or change is available for synchronization. This is indicated by block 366. It then waits to receive a pull request from the workloads where the policy is to be applied. This is indicated by block 368 in FIG. 6.

Once a pull request is received, policy distribution system 154 sends the unified representation of the update to the requesting workload. It is illustratively sent to the policy synchronization manager 130-132 for the requesting workload 106-108. This is indicated by block 370 in FIG. 6. The synchronization manager then synchronizes the update to the requesting workload and sends back a status indicator 168-170 (in FIG. 1) to policy status processing system 156, indicating that the policy is being applied, has been applied successfully, has been applied with errors, etc. Receiving the status indicator from the requesting workload is indicated by block 372. Policy status processing system 156 then updates the distribution status for the compliance policy update. This is indicated by block 374. Examples of how this status is displayed were described with respect to FIGS. 4C-4F.

It can thus be seen that the compliance policy update is distributed to the relevant workloads 106-108 using a hybrid push/pull approach. When a policy update is ready for synchronization to a workload, the policy distribution system 154 sends a notification to that workload that a policy update is ready for synchronization. In one example, it doesn't push the actual policy update (which can be relatively large) but only sends a notification. The relevant workload persists that notification and then pulls the actual compliance policy update from distribution system 154 when the workload is ready to synchronize it. The pull can be done incrementally, so that only certain changes are pulled at any given time. As is described in greater detail below, the policy synchronization manager 130-132 of the relevant workload 106-108 keeps track of the various changes it has made so that it can ask for additional changes (that have been notified) as it can make them. This approach obtains the advantages of both a push architecture and a pull architecture, while avoiding their disadvantages. For instance, the advantage of a push architecture is that data is only pushed when a change has been made. This leads to efficiency. The disadvantage is that the pusher must maintain connections for all the end points it needs to push. In a large scalable service, this can be problematic as there are too many end points to push and the code to do so becomes relatively complex. The advantage of a pull architecture is that the puller only needs to maintain one connection with the source so the code is relatively simple. The disadvantage of pulling is that the puller doesn't know when to pull. That is, it doesn't know when a change has actually been made. If it pulls too frequently, but the data hasn't changed, this can waste computational and memory resources. It can also waste network bandwidth. If the puller pulls too infrequently, then the user experience can suffer because the user does not see changes quickly enough. By using a hybrid push/pull architecture, the present system can obtain the advantages of both architectures while avoiding the disadvantages.

Figure 7:
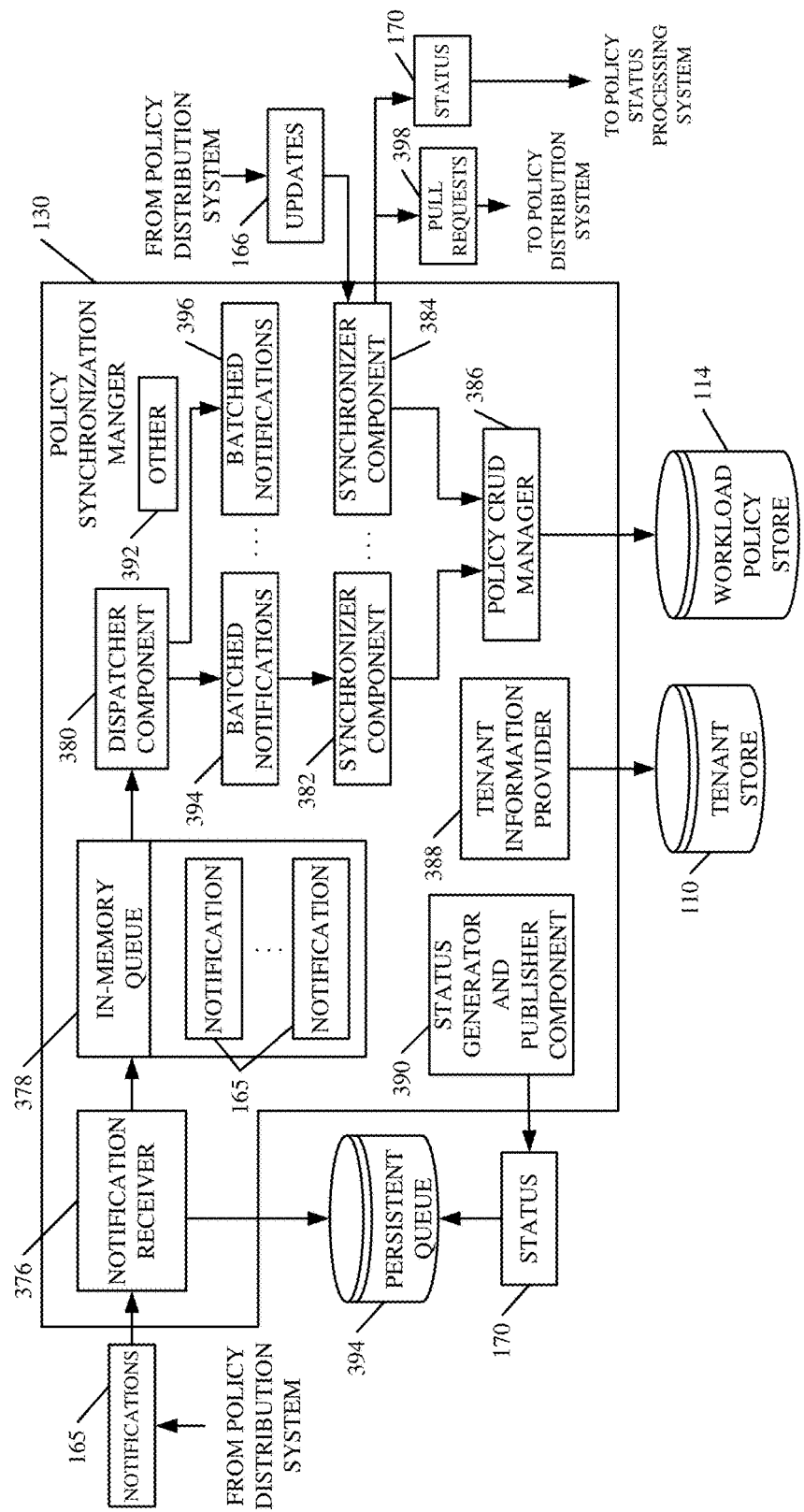
FIG. 7 is a block diagram showing one example of a policy synchronization manager in more detail.

FIG. 7 is a block diagram illustrating one example of a policy synchronization manager 130-132 in more detail. For the sake of example, FIG. 7 shows a more detailed block diagram of policy synchronization manager 130. However, it will be noted that the block diagram can just as easily apply to policy synchronization manager 132.

Policy synchronization manager 130 can illustratively include notification receiver 376, in-memory notification queue 378, dispatcher component 380, one or more synchronizer components 382-384, policy CRUD manager 386, tenant information provider 388, and status generator and publisher component 390. It can include other items 392 as well. FIG. 7 shows that, in one example, policy synchronization manager 130 is also coupled to a persistent storage queue 394. All of the components of policy synchronization manager 130 can share the same interface across all workloads 106-108.

Before describing the overall operation of policy synchronization manager 130 in more detail, a brief overview will first be provided. Notification receiver 376 listens for policy update notifications 165 from policy distribution system 154. It then places them in persistent queue 394 so that they are not lost in case policy synchronization manager 130 crashes or its operation is disrupted for some reason. It also places them in in-memory queue 378. They can be placed in queue 378 in a variety of different orders. For instance, if they are urgent, they can be placed at the top of the queue. Otherwise, they can be placed in the queue on a first-come, first-served basis. Dispatcher component 380 drains the notifications 165 from queue 378. Each notification 165 is viewed as a work item that is to be sent to a synchronizer component 382. In one example, dispatcher component 380 can batch the notifications into batches 394-396 and send them, in batches, to different synchronizer components 382-384. Synchronizer components 382-384 call the policy CRUD manager 386 (which can be the same as policy CRUD system 152 shown in FIG. 1, but with a subset of the functionality enabled) to perform the updates represented by the given notification being operated on. In doing so, it can generate pull requests 398 that it sends to policy distribution system 154 to pull the actual compliance policy updates that need to be synchronized. In response, system 154 sends the compliance policy updates 166 that need to be synchronized to the workload that contains policy synchronization manager 130. Each synchronizer component 382 makes the necessary calls on policy CRUD manager 386 in order to make the updates 166 and store them in the workload policy store 114 that stores the compliance policies for the given workload.

Tenant information provider 388 can also make calls on tenant store 110 in order to store relevant tenant information, such as the status of the policy updates, the current version of the policy, diagnostic data (such as how many times a given synchronizer component has attempted to synchronize a policy), etc. Status generator and publisher component 390 generates the status indicators indicating the status of application of the given compliance policy update and places it in persistent queue 394 and in-memory queue 378. Dispatcher component 300 dispatches the status 170 to a synchronizer component 382 which sends it back to policy status processing system 156, where it can be displayed to the user, as discussed above.

Figure 8:
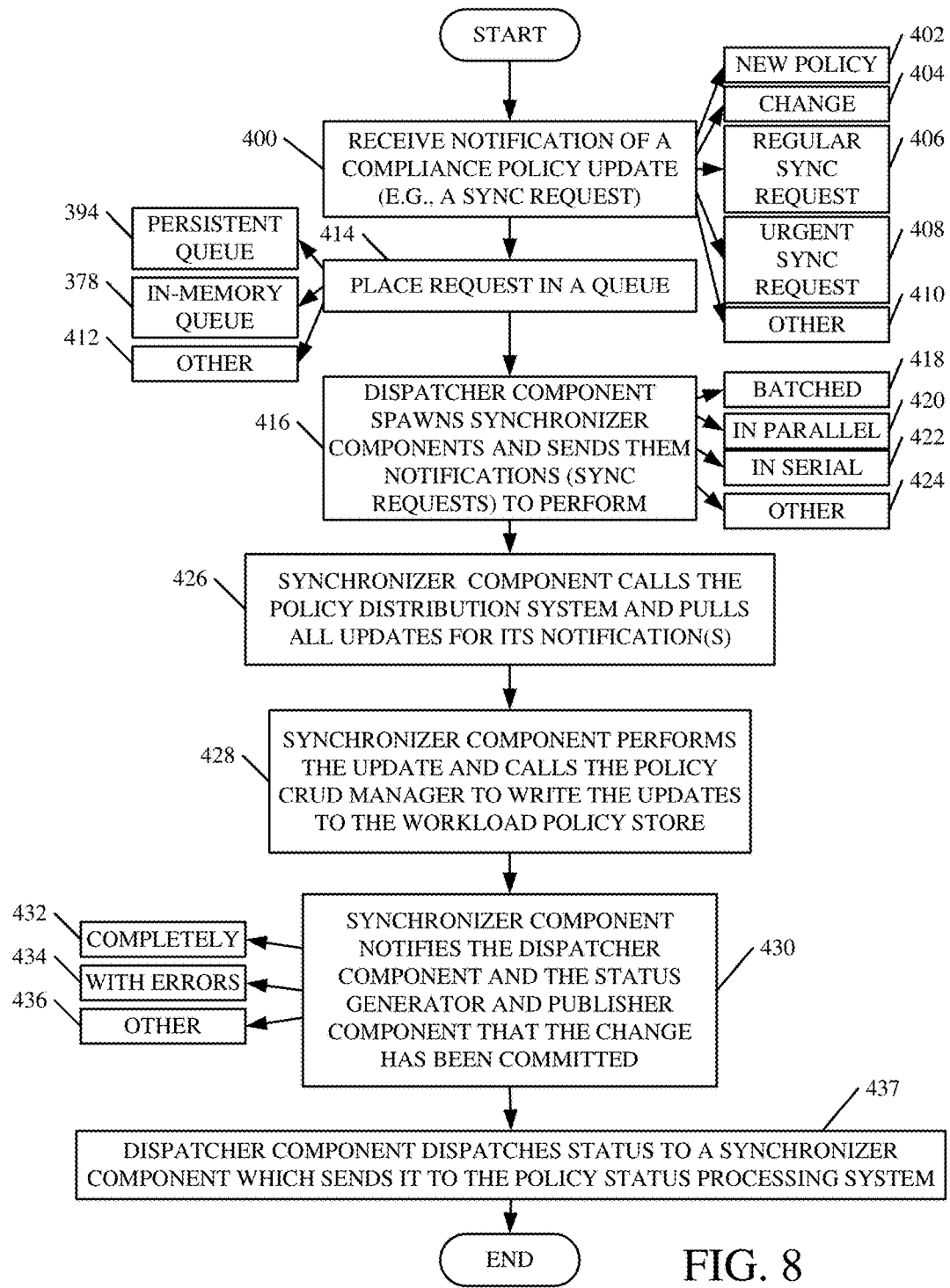
FIG. 8 is a flow diagram illustrating one example of the operation of the policy synchronization manager shown in FIG. 7.

FIG. 8 is a flow diagram illustrating one embodiment of the operation of policy synchronization manager 130 in more detail. Notification receiver 376 first receives a notification 165 that a compliance policy update has been generated and is to be synchronized to the workload 106 that contains policy synchronization manager 130. The notification can also be referred to as a synchronization request (or sync request). Receiving the notification is indicated by block 400 in FIG. 8.

The notification can indicate that a new compliance policy 402 is to be synchronized to the workload or that a change or update to an existing compliance policy is to be synchronized. The notification can also indicate a regular synchronization request 406, or an urgent synchronization request 408. A regular request may be provided, for instance, when user 150 simply makes a change to the compliance policy and commits it to central compliance policy store 104. This will cause policy distribution system 154 to send a regular notification to the relevant workload. An urgent sync request may be generated, for instance, when the policy synchronization manager 130 has not completed synchronizing a compliance policy, after a normal service interval. In that case, user 150 or policy distribution system 154 may generate an urgent request. Of course, the notifications can be generated and received in other ways as well, and this is indicated by block 410.

Notification receiver 376 then places the notification in persistent queue 394 and in in-memory queue 378. It can store the notification in other ways 412 as well. Placing the request in a queue is indicated by block 414. Again, if the notification is a normal notification, notification receiver 376 may simply place the notification in queue 378 and 394 at the end of the queue. However, if it is an urgent notification, then it may be placed at the head of the queue.

Dispatcher component 380 then spawns one or more synchronizer components 382-384 (if they are needed) and de-queues the notifications 165 from queue 378 and sends them to the spawned synchronizer components. This is indicated by block 416 in the flow diagram of FIG. 8. Again, they can be batched as indicated by block 418. The batches can be sent to synchronizer component 382-384 either in parallel as indicated by block 420 or in serial as indicated by block 422. The notifications can be sent to synchronizer components 382-384 in other ways as well and this is indicated by block 424.

The synchronizer components 382-384 then call the policy distribution system 154 to pull all updates corresponding to a notification currently being processed. This is indicated by block 426 in FIG. 8. In response, the unified representations of the updates corresponding to the notifications being processed are received.

The synchronizer component 382-384 then call the policy CRUD manager 386 to perform the updates and to write the updates to the workload policy store 114. This is indicated by block 428.

Synchronizer components 382-384 then notify the dispatcher component 380 and the status generator and publisher component 390 that the change has been committed. This is indicated by block 430 in FIG. 8. The synchronizer components 382-384 can indicate that the update has been committed completely as indicated by block 432 or with errors as indicated by block 434, or in other ways as indicated by block 436.

Status generator and publisher 390 places the status in queues 394 and 378 (or this can be done by notification receiver 376) where dispatcher component 380 dispatches it to a synchronizer component 382-384. The synchronizer component sends the status to the policy status processing system. This is indicated by block 437 in FIG. 8.

Figure 9:
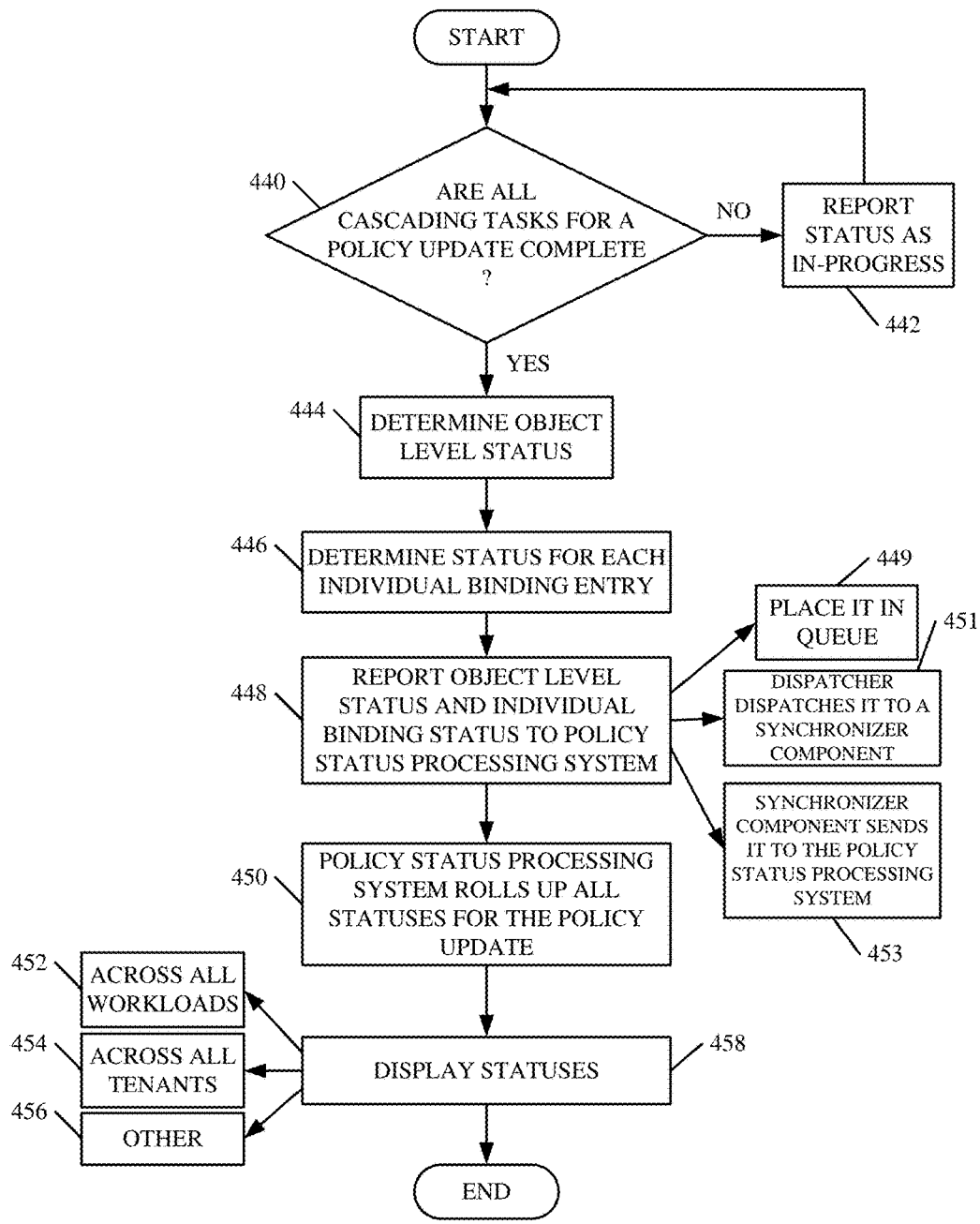
FIG. 9 is a flow diagram illustrating one example of how policy application status is reported.

FIG. 9 is a flow diagram illustrating one example of the operation of status generator and publisher component 390 in generating and publishing the status of a compliance policy update. It will first be noted that, currently, when a compliance policy is submitted for application to a workload, it can be difficult to know when the compliance policy has been actually applied at the workloads. Further, it can be difficult to know whether it has been applied successfully or unsuccessfully. If unsuccessfully, it can also be difficult to know which particular errors occurred in attempting to apply the policy. Thus, in one example, status generator and publisher component 390 generates the accurate status of application of the compliance policy to the given workload and reports that back to policy status processing system 156 in the compliance policy authoring and management system 102. Thus, user 150 (who may be an administrator of an enterprise system, for instance) will have accurate information as to whether the compliance policy has been applied, when it was applied, and whether it has been applied successfully. If not, the particular errors can easily be viewed.

Component 390 first determines whether all of the cascading tasks for a policy update (including automatic retries) have been completed. For instance, it may be that a synchronizer component 382 automatically retires to commit policy updates where the first attempt has failed. If all of these cascading tasks for performing the policy update have not yet been completed, then this is detected by status generator and publisher component 390 and component 390 publishes the status as in-progress, deploying, or some similar status indicating that the compliance policy update is currently in the process of being synchronized to the given workload. Determining whether the tasks are complete and reporting the status as in-progress are indicated by blocks 440 and 442 in FIG. 9.

Once the tasks are complete, the component 390 determines both an object level status for the policy update and a status for each individual binding entry for the compliance policy update. Determining the object level status is indicated by block 444 in FIG. 9, and determining the individual binding status is indicated by block 446.

The object level status indicates the status of the overall compliance policy update that is being applied. The individual binding status indicates the status of whether the compliance policy update has been successfully applied to each of the individual bindings that indicate where that update is to be applied. Component 390 aggregates the object level status and the status for each individual binding entry and reports them both to the policy status processing system 156 in compliance policy authoring and management system 102 (shown in FIG. 1). This is indicated by block 448 in the flow diagram of FIG. 9. In doing so, component 390 illustratively takes advantage of the structure of policy synchronization manager 130. Therefore, it writes the status 170 to persistent queue 394 and in-memory queue 378 (or provides status 170 to notification receiver 376 which writes it to queues 378 and 394). Dispatcher component 380 dispatches status 170 to a synchronizer component 382-384 which sends it to policy status processing system 156. This is indicated by blocks 449, 451 and 453 in FIG. 9.

It may be that the compliance policy update is to be applied to more than one workload. In that case, policy status processing system 156 rolls up all of the statuses for the policy update, from all of the workloads 106-108 where it is being applied, and displays these statuses, along with drill down functionality so that user 150 can drill into the details of these status indicators. Rolling up all of the statuses is indicated by block 450 in FIG. 9. Rolling them up across workloads is indicated by block 452. Rolling them up across all tenants is indicated by block 454, rolling them up in other ways is indicated by block 456, and displaying them is indicated by block 458.

Figure 10:
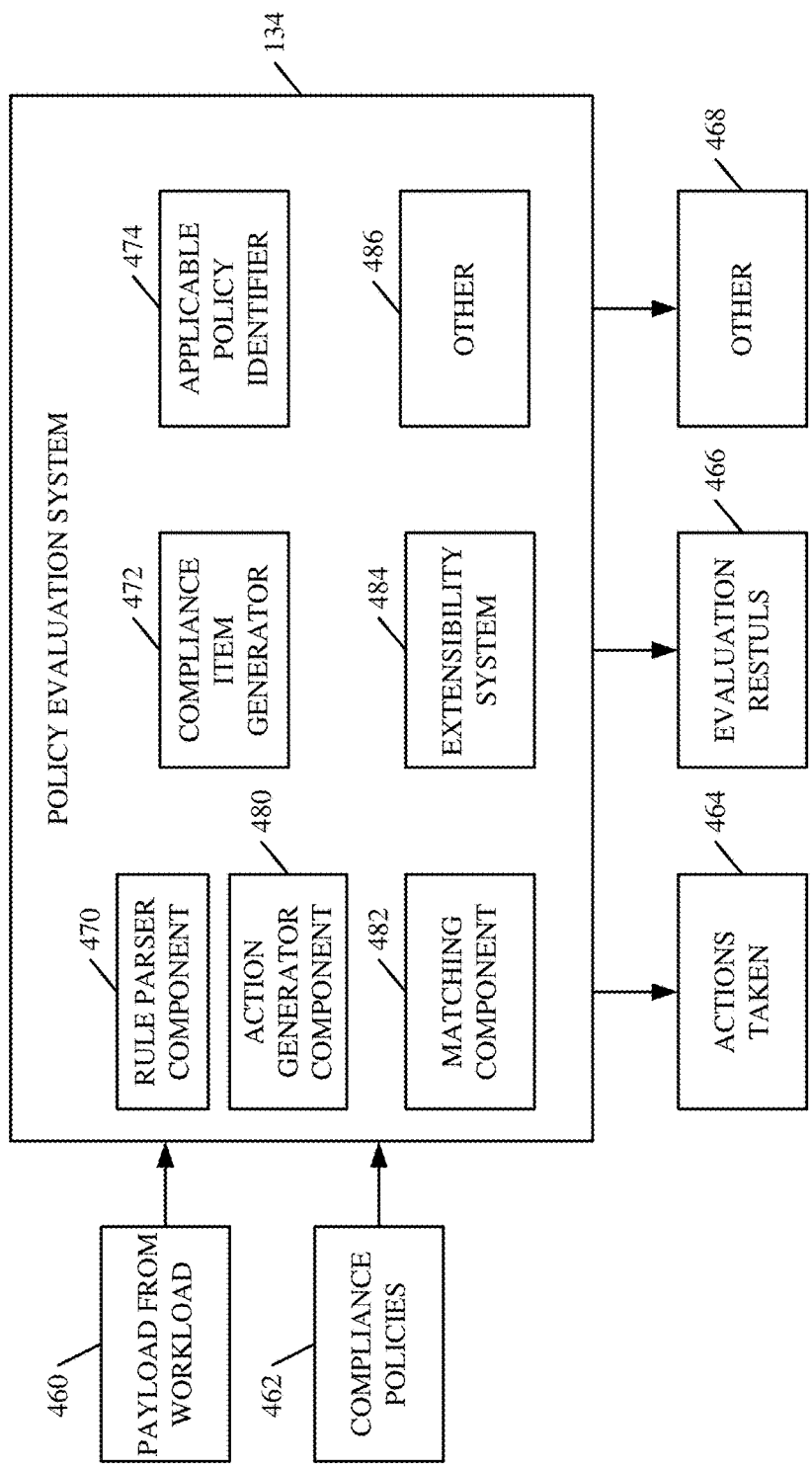
FIG. 10 is a block diagram showing one example of a policy evaluation system in more detail.

Once a compliance policy update has been successfully synchronized to a given workload 106-108, it can then be used by that workload in processing data. This is illustratively done by policy evaluation systems 134-136 in the workloads 106-108. In doing so, evaluation systems 134-136 illustratively receive payload information (e.g., data to which the compliance policy is to be applied) and then evaluates that data against the various compliance policy rules that have been synchronized to the workload to determine whether any apply, and whether any actions need to be taken according to the compliance policy. FIGS. 10 and 11 illustrate one example of this in more detail. FIG. 10 is a block diagram showing one example of a policy evaluation system 134-136 in more detail. For the example shown in FIG. 10, it will be assumed that the policy evaluation system is system 134 from workload 106. However, it will be appreciated that the description of FIG. 10 can just as easily be applied to policy evaluation system 136 in other workloads.

FIG. 10 shows that policy evaluation system 134 illustratively receives payload information from the workload 106. The payload information is indicated by block 460 in FIG. 10. It also accesses the compliance policies 462 from the workload policy store 114. It then evaluates the policies relative to the workload and can indicate actions to be taken 464, it can output the evaluation results 466, and it can generate other items 468 as well. FIG. 10 shows that, in one example, policy evaluation system 134 includes rule parser component 470, compliance item generator 472, applicable policy identifier 474, action generator component 480, matching component 482, extensibility system 484, and it can include other items 486 as well.

Before describing the operation of system 134 in more detail, a brief overview will first be provided. Compliance item generator 472 calls an interface implemented by the workload to generate a unified representation of the payload item 460, so that it can be analyzed against the compliance policies. Applicable policy identifier 474 identities relevant policies and rule parser component 470 parses the unified representation of the relevant policies to identify predicates, conditions and actions. Action generator component 480 generates action objects corresponding to the actions. Where the actions are workload-specific actions, component 480 calls an interface on the workload and has the workload create the action object. Matching component 482 then matches conditions for each rule against the unified representation of the payload item 460 to see if any rules match. If so, it invokes the corresponding action objects to perform desired actions.

Figure 11A:
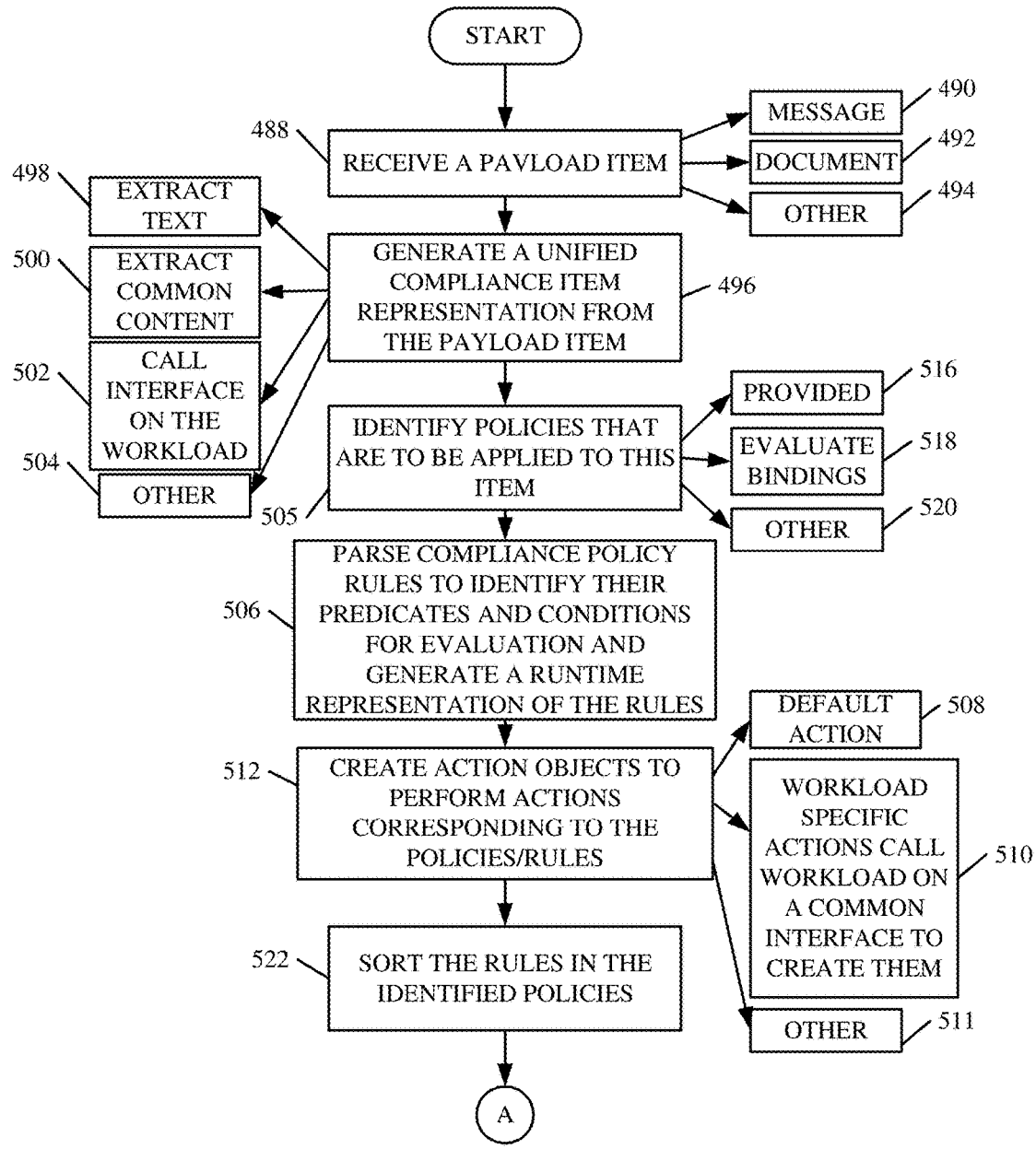
FIGS. 11A and 11B (collectively FIG. 11) show a flow diagram illustrating one example of how policies are evaluated against content (or payload items).
Figure 11B:
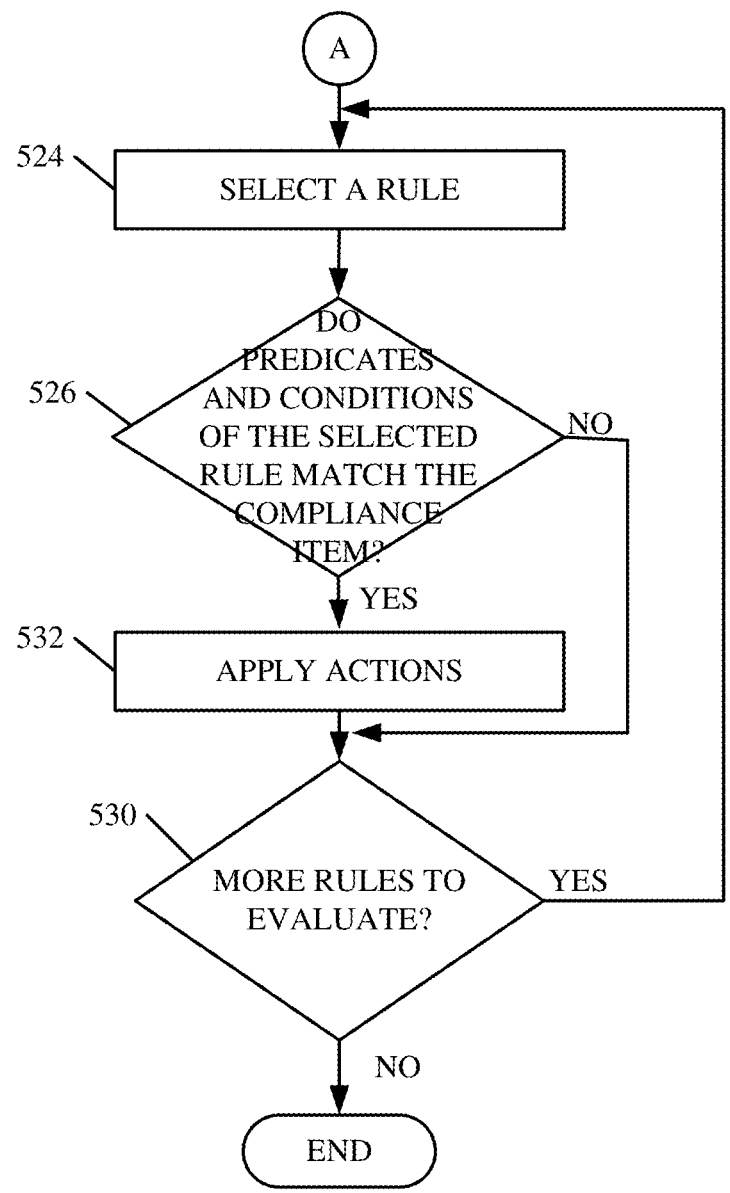

FIGS. 11A and 11B (collectively FIG. 11) show a flow diagram illustrating one example of how policy evaluation system 134 evaluates received payload items 460 to determine whether a compliance policy applies to it and if so, the actions that need to be taken. Compliance item generator 472 first receives a payload item 460 from the workload. This is indicated by block 488 in FIG. 11. For example, where the workload is an electronic mail system, the payload item 460 may be a message 490. Where it is a document management system, the payload item 460 may be a document 492. Where it is another type of workload, the payload item will be another type of payload item 494.

Compliance item generator 472 then generates a unified compliance item representation of the workload item 460. This is indicated by block 496. By way of example, in order to support a common set of rules (conditions and actions) across multiple different types of workloads, the items to be evaluated (e.g., the messages, documents, etc.) are first converted into a form by which they are represented by a common schema. In doing so, compliance item generator 472 can call an application programming interface (API) implemented by the workload to extract text from the workload item as indicated by block 498. It can also extract common content that is to be placed in the schema. This is indicated by block 500. Calling the API on the workload in order to obtain this type of information is indicated by block 502. It can generate a compliance item in the common schema in other ways as well, and this is indicated by block 504.

Table 4 shows one example of a compliance item schema that can be used to represent a payload item 460 that is received for evaluation by system 134. Table 5 shows one example of a class definition of the item, implementing the common schema.

TABLE 4

| Property Name | Type | Remark |
| --- | --- | --- |
| Id | string | Unique ID. |
| Workload | Enum | Enum of the unique workloads. It is used for logging as well as any future partition purpose. This is a calculated property based on Context. |
| Type | string | Type of the item. |
| Name | string | Friendly name of the item. For mail message, this is the subject. For documents, this is the full document name with extension. |
| Created | DateTime | Creation time |
| Creator | string | UPN or Common Name of the creator |
| LastModified | DateTime | Last modified time |
| LastModifier | string | UPN or Common Name of the last modifier |
| Expiry | DateTime | Expiry date of the itemExpiry date of the item |
| ClassificationsScanned | IList<Guid> | List of classifications item was scanned for. May contain a special Guid that indicates AllAvailableClassifications |
| ClassificationsDiscovered | IList<Guid> | List of classifications of the item after content analysis in the forms of GUID |
| BodyStream | Stream | Message or document body binary stream. Exposed as a GetBodyStream method to express caller stream ownership |
| BodyText | Stream | Message or document body text, if available. Exposed as a GetBodyText method |
| Attachments | IList<PolicyItem> | List of attachments |
| ShouldAudit | Boolean | Indicates whether actions applied on this item should add audit trail |

TABLE 5

```
/// <summary>
/// Represents an item (a unit of work) passed into the policy engine
/// </summary>
public class PolicyItem
{
    virtual public string Id { get; private set }
    virtual public string Type { get; private set; }
    virtual public string Name { get; private set; }
    virtual public DateTime CreationDate { get; private set; }
    virtual public string Creator { get; private set; }
    virtual public DateTime LastModified { get; private set; }
        virtual public string LastModifier { get; private set; }
        virtual public DateTime Expiry { get; private set; }
    static const Guid AllClassifications = new Guid("1EF9DD8A-D749-476C-906C-FD66E1CF44FD");
        virtual public IList<Guid> ClassificationsScanned { get; }
        virtual public IList<Guid> ClassificationsDiscovered { get; }
        virtual public Stream GetBodyStream( );
        virtual public Stream GetBodyTextStream( );
        virtual public string Type { get; }
```

TABLE 5-continued

```
    virtual public IList<PolicyItem> Attachments { get; }
    virtual public bool ShouldAudit { get; private set; }
}
```

Once compliance item generator 472 has extracted the common schema values from the payload item 460 and generated the compliance item according to the common schema, applicable policy identifier 474 identifies applicable policies that may be applicable to the compliance item. This is indicated by block 505 in FIG. 11. The relevant rules or policies can be identified along with the compliance item, itself, as indicated by block 516. Component 474 can also evaluate the bindings in the policies being evaluated to determine whether any of its rules apply to this compliance item. This is indicated by block 518. Determining whether the policies apply to this item can be determined in other ways 420 as well.

Rule parser component 470 parses the compliance policy to identify rules and their predicates and conditions for evaluation. The rule parser component 470 reads and parses the unified representation of each rule (e.g., the rule XML) and matches the tag of each condition with an object class factory API to create the runtime object that represents that rule. Where the rule is a workload-specific rule, the workload implements an API that can be called to create the runtime object that represents that workload-specific rule. Action generator 480 creates the objects that represent the actions in the parsed rules. Where they are workload-specific actions, it calls the API on the workload to have the workload create the corresponding objects. Creating the action objects is indicated by block 512 in FIG. 11. Default actions are indicated by block 508, workload-specific actions are indicated by block 510 and other actions are indicated by block 511.

Matching component 482 then sorts the rules in the identified policies that are to be applied to this compliance item. This is indicated by block 522. It then selects a rule as indicated by block 524. It then compares the predicates and conditions in the selected rule against the compliance item to see whether they match. This is indicated by block 526. If the predicates do not match, or if the predicates match but the conditions do not match, then processing skips to block 530 where additional rules are evaluated, if any. However, if the predicates and conditions do match the compliance item, then the actions associated with the matching rules are identified and applied. This is indicated by block 532.

By way of example, assume that the bindings provide a predicate indicating that a compliance policy is to be applied to a given set of mailboxes. Assume that the conditions indicate certain textual items that must be contained in the body of an electronic mail message in one of those mailboxes for the actions to be taken. Assume that the action to be taken is that the electronic mail message is to be saved in a data store for a specified period of time, before it is automatically deleted. In that case, matching component 482 will first determine whether the compliance item that represents a given electronic mail message is in one of the listed mailboxes. If so, it will then determine whether the body of the mail message contains the contextual items. If that is true, then the message will be saved at a specified location and marked for automatic deletion at a certain point in the future.

Policy evaluation system 134 performs the evaluations of all of the rules in policies that are to be applied to the compliance item. When all of the rules have been evaluated, the processing is complete.

Extensibility system 482 can be provided in policy evaluation system 134 or spread across a workload. In one example, system 484 allows extensibility by having system 484 implement workload-specific interfaces. A compliance item interface is used to generate the compliance item that represents the payload item (e.g., the document or electronic mail message, etc.) that is to be evaluated. A rule parser and condition/action interface is implemented and represents the creation of workload-specific rules.

It can thus be seen that a unified compliance policy framework includes an architecture and a set of schemas and APIs. The framework enables different services to plug into a single framework to achieve a unified experience in compliance policy management and enforcement. A single markup language (e.g., XML) schema and runtime object model expresses compliance policies in a way that can be used by multiple different services or workloads. This significantly increases reliability in the management of such policies. A single runtime object model represents payload items that are to be evaluated by the compliance policy evaluation system. Thus, the single runtime object model represents documents, e-mails, chat conversations, etc., depending upon the workload. An extensibility system allows for the addition of different compliance policy scenarios. The policy evaluation system 134 can be represented by an application programming interface that can be run across multiple different services or workloads to evaluate policies using the unified schema that represents the policies and the unified schema that represents the objects for evaluation. The synchronization system allows policies to be synchronized across various workloads from a central location. The synchronization model includes notification and incremental data pulling to obtain the benefits of both types of architectures.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
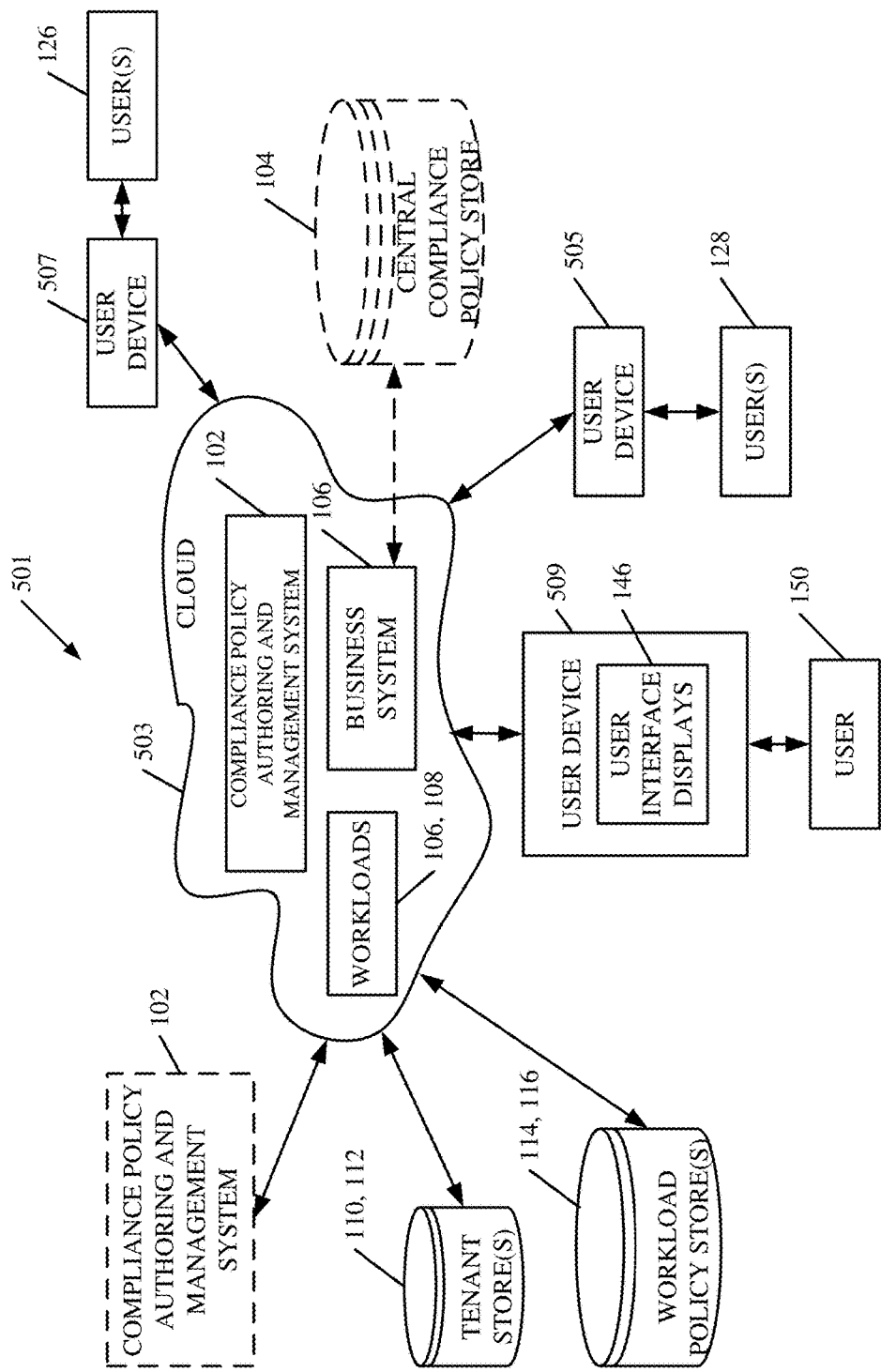
FIG. 12 is a block diagram showing one example of the architecture illustrated in FIG. 1, deployed in a cloud computing architecture.

FIG. 12 is a block diagram of architecture 100, shown in FIG. 1, except that its elements are disposed in a cloud computing architecture 501. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 12, some items are similar to those shown in FIG. 1 and they are similarly numbered. FIG. 12 specifically shows that some or all items in architecture 100 can be located in cloud 503 (which can be public, private, or a combination where portions are public while others are private). Therefore, users 126, 128, 150 can use user devices 505, 507 and 509 to access those systems through cloud 502.

FIG. 12 also depicts another embodiment of a cloud architecture. FIG. 12 shows that it is also contemplated that some elements of architecture 100 can be disposed in cloud 503 while others are not. By way of example, data stores 104, 110, 112, 114 and 116 can be disposed outside of cloud 503, and accessed through cloud 503. In another embodiment, compliance policy authoring and management system 102 can be outside of cloud 502. Regardless of where they are located, they can be accessed directly by the user devices through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
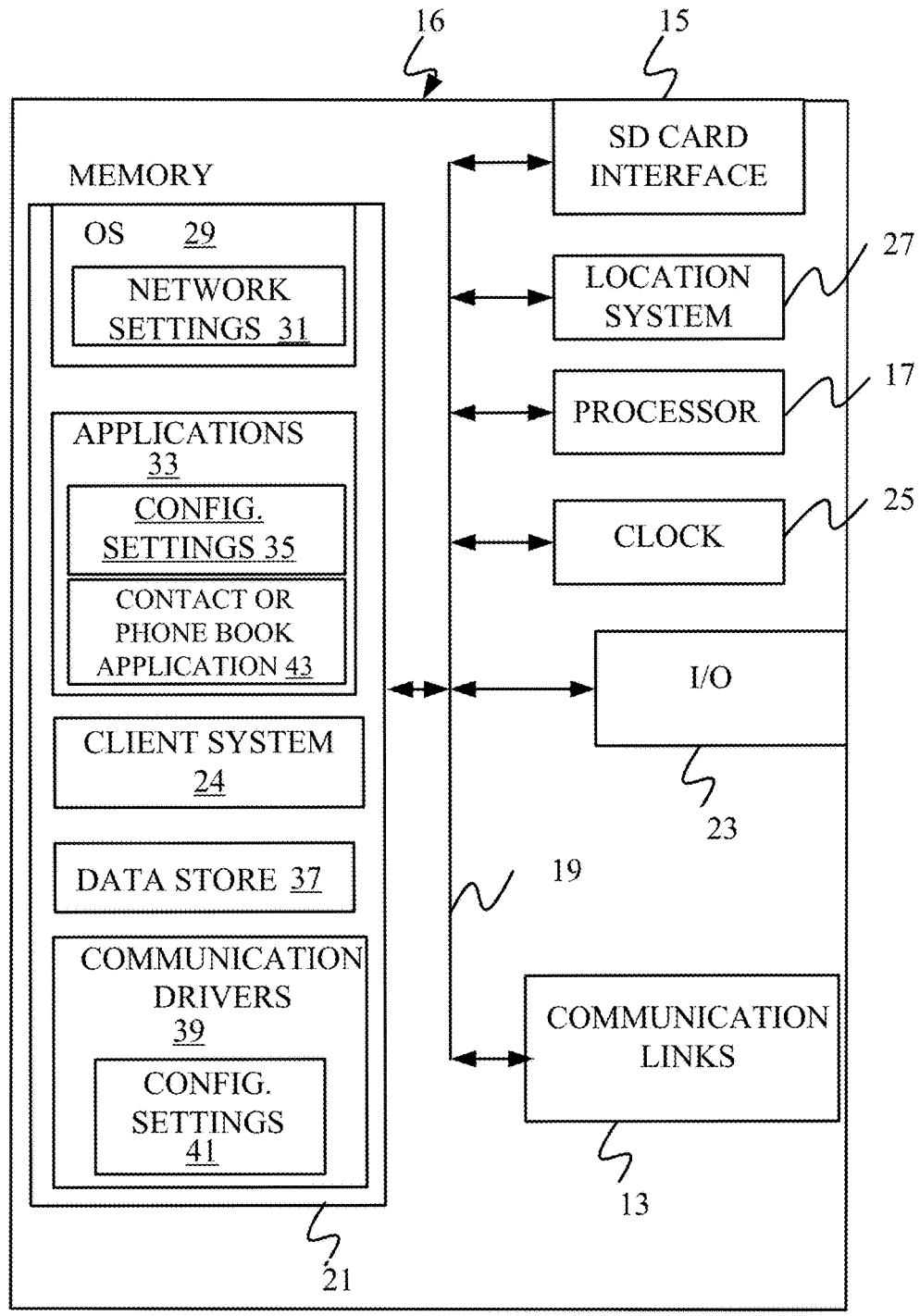
FIGS. 13-15 show various examples of mobile devices.
Figure 14:
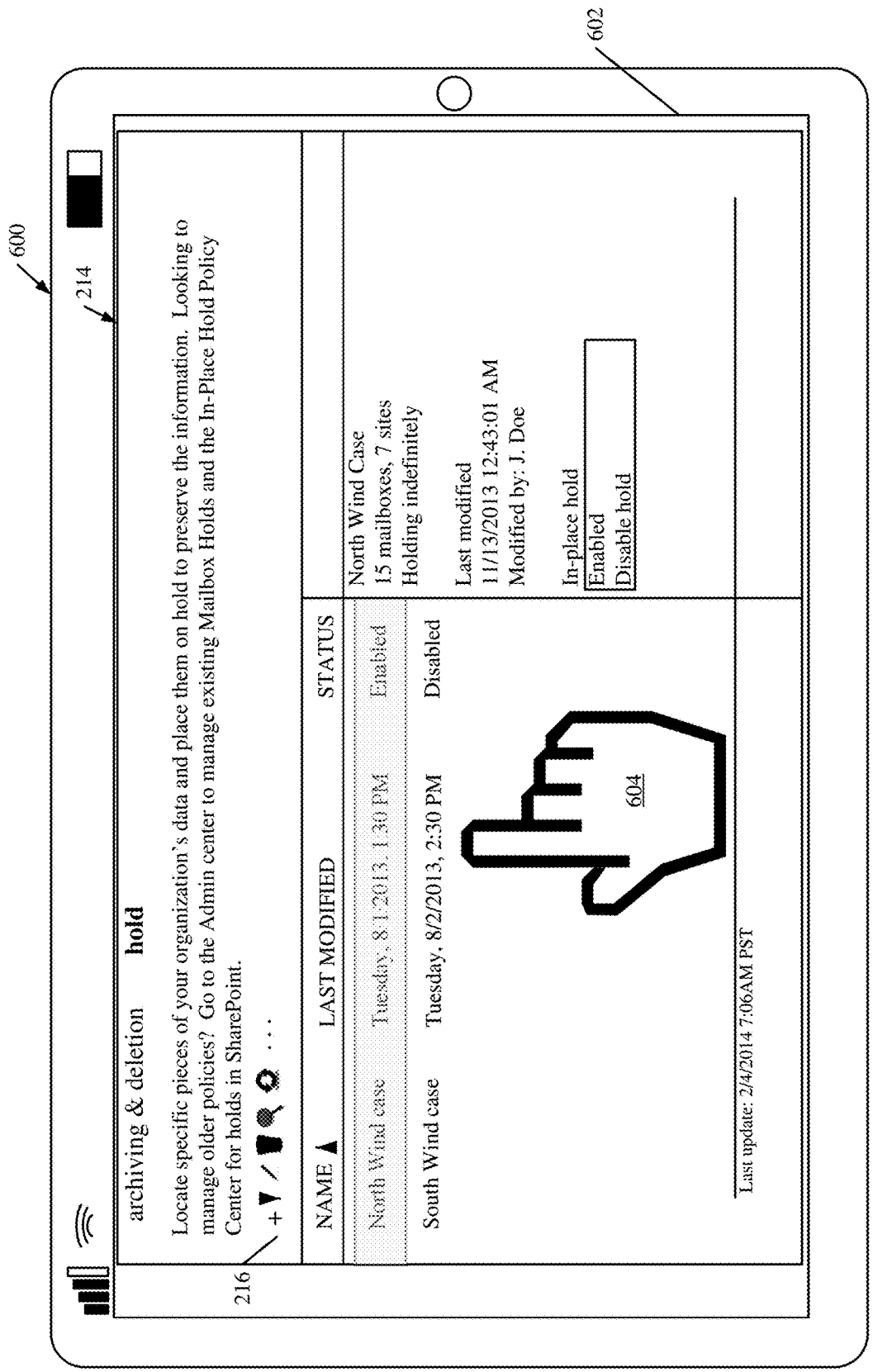
Figure 15:
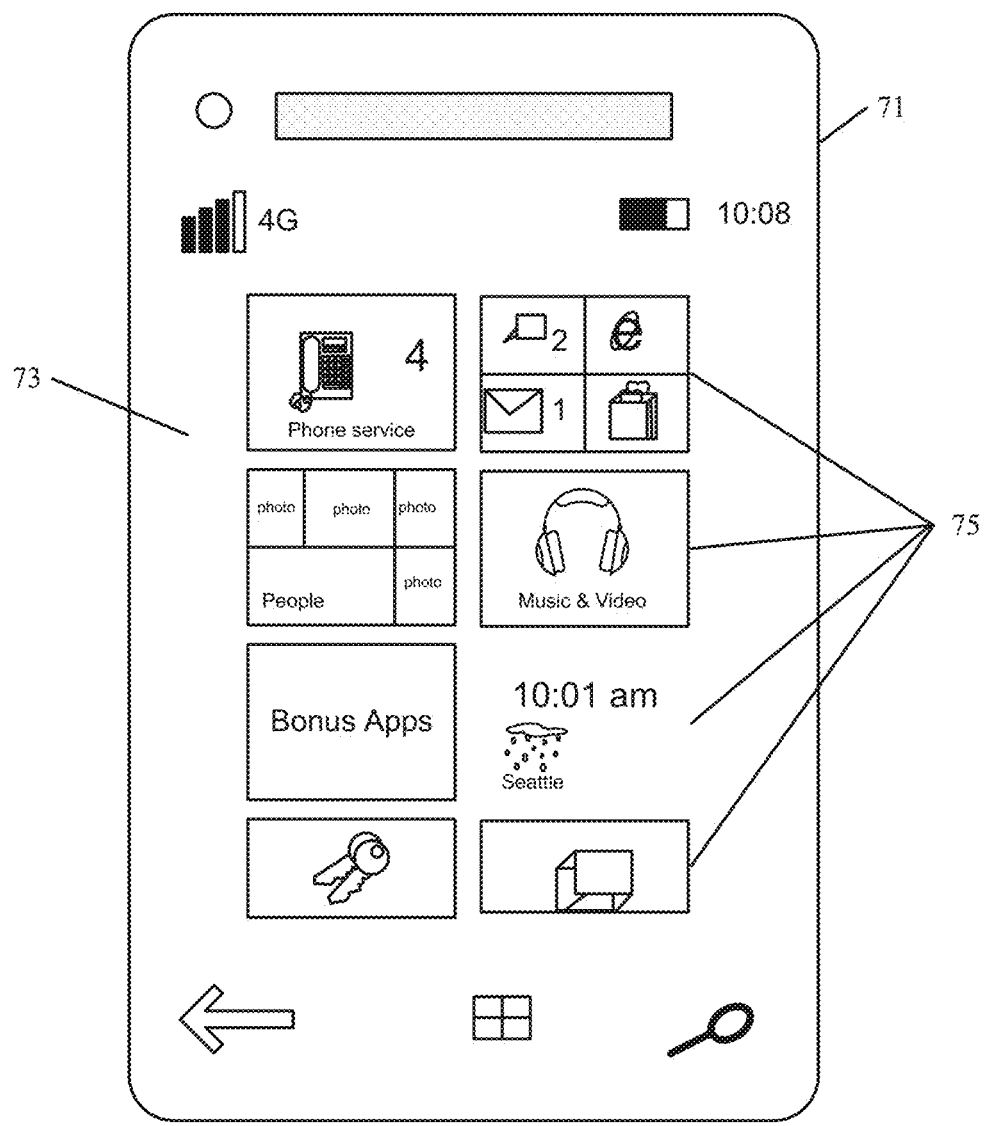

FIG. 13 is a simplified block diagram of one illustrative embodiment of a handheld or mobile computing device that can be used as a user's or client's hand held device 16, in which the present system (or parts of it) can be deployed. FIGS. 14-15 are examples of handheld or mobile devices.

FIG. 13 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody the various processors from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 154 or the items in data store 156, for example, can reside in memory 21. Similarly, device 16 can have a client system 24 which can run various applications or embody architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 14 shows one embodiment in which device 16 is a tablet computer 600. In FIG. 14, computer 600 is shown with the user interface display (from FIG. 3A) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some embodiments, the phone also includes a Secure Digital (SD) card slot that accepts a SD card.

The mobile device can also be a personal digital assistant (PDA) or a multimedia player or a tablet computing device, etc. (hereinafter referred to as PDA). The PDA includes an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
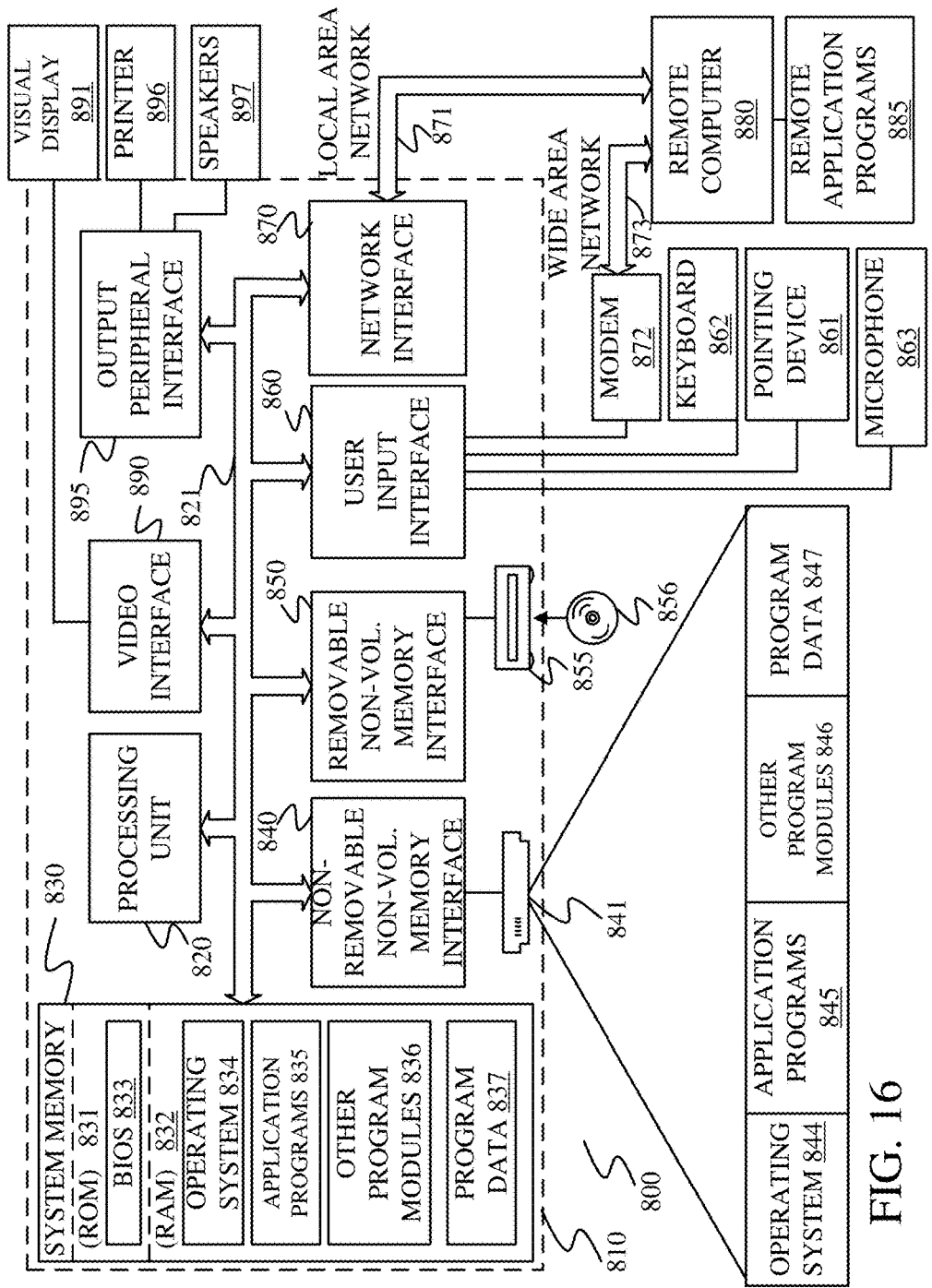
FIG. 16 is a block diagram of one example of a computing environment.

FIG. 16 is one embodiment of a computing environment in which architecture 100, or parts of it, (for example) can be deployed. With reference to FIG. 16, an exemplary system for implementing some embodiments includes a general-purpose computing device in the form of a computer 810. Components of computer 810 may include, but are not limited to, a processing unit 820 (which can comprise various processors from the previous description), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 16 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 16 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer system, comprising:
a policy update system that displays policy definition user input mechanisms that are actuated to define a compliance policy update;
a schema generator component that, based on actuation of the policy definition user input mechanisms, generates a unified compliance policy update that represents the compliance policy update according to a unified schema that is consistent across a plurality of different workloads;
a policy distribution system that sends the unified compliance policy update to at least a given workload, of the plurality of different workloads; and
a computer processor that is a functional part of the computer system and is activated by the policy update system, the schema generator component and the policy distribution system to facilitate displaying, generating and sending.

Example 2 is the computer system of any or all previous examples and further comprising:
a policy status processing system that receives a deployment status indicator from each of the plurality of different workloads and generates a status display corresponding to the compliance policy update based on the deployment status indicators.

Example 3 is the computer system of any or all previous examples wherein the schema generator generates the unified compliance policy update according to the unified schema wherein the unified schema has hierarchically arranged nodes representing rules, conditions corresponding to the rules, and actions, the conditions identifying conditions that are to be present in a payload item at the given workload for the corresponding rule to apply, and the actions identifying actions to be taken relative to the payload item when the corresponding rule applies.

Example 4 is the computer system of any or all previous examples wherein the schema generator receives extension information indicative of additional, user defined, rules, conditions and actions and extends the unified compliance policy update to include nodes representing the additional rules, conditions and actions.

Example 5 is the computer system of any or all previous examples wherein the policy update system comprises:
a policy identifier component that displays a compliance policy identifier user input mechanism that receives policy identifier information for the compliance policy update.

Example 6 is the computer system of any or all previous examples wherein the policy update system comprises:
a policy condition component that displays a policy condition user input mechanism that is actuatable to identify compliance policy conditions for the compliance policy update to apply to a payload item at the given workload.

Example 7 is the computer system of any or all previous examples wherein the policy update system comprises:

a policy binding component that displays a policy binding user input mechanism that is actuatable to identify compliance policy bindings that identify categories of payload items that the compliance policy update applies to at the given workload.

Example 8 is the computer system of any or all previous examples wherein the policy update system comprises:

a policy action component that displays a policy action user input mechanism that is actuatable to identify compliance policy actions when the compliance policy update applies to a payload item at the given workload.

Example 9 is the computer system of any or all previous examples wherein the policy distribution system receives the unified compliance policy update and stores it to a central compliance policy store and sends a notification to the given workload that a compliance policy update is available for the given workload.

Example 10 is the computer system of any or all previous examples wherein the policy distribution system receives a pull request from the given workload and sends the unified compliance policy update to the given workload.

Example 11 is a computer system, comprising:

a compliance item generator that generates a unified payload item representation of a payload item from a workload on which the compliance item generator is used, the unified payload item representation being unified across a plurality of different workloads;

a rule parser component that accesses a unified representation of a compliance policy rule and generates a runtime representation of the compliance policy rule, the runtime representation including condition representations of conditions under which the compliance policy rule applies to the payload item represented by the unified payload item representation;

a matching component that matches the conditions in the runtime representation of the compliance policy rule against information in the unified payload item representation to determine whether a match occurs;

an action component that performs actions, identified in the runtime representation of the compliance policy rule, in response to the match; and a computer processor that is a functional part of the computer system and that is activated by the compliance item generator, the rule parser component, the matching component and the action component to facilitate generating the unified payload item representation, generating the runtime representation of the compliance policy rule, matching the conditions, and performing the actions.

Example 12 is the computer system of any or all previous examples wherein the rule parser generates the action component.

Example 13 is the computer system of any or all previous examples wherein the rule parser generates the action component by determining whether the action is a workload-specific action, and, if so, calling an application programming interface (API) exposed by the workload to have the workload generate the action component.

Example 14 is the computer system of any or all previous examples wherein the compliance item generator generates the unified payload item representation of the payload item by calling an application programming interface (API) exposed by the workload to extract information from the payload to form the unified payload item representation.

Example 15 is the computer system of any or all previous examples wherein the compliance item generator calls the API to obtain common content that is common to all unified payload item representations and to obtain text from the payload item.

Example 16 is a computer-implemented method, comprising:

receiving a unified representation of a compliance policy to be deployed at a given workload, the unified representation being formed according to a policy schema that is common across different workloads;

deploying the compliance policy at the given workload;

receiving a unified representation of a payload item from a workload, the unified representation of the payload item being unified across workloads;

evaluating the payload item, using the unified representation of the payload item, against rules in the compliance policy, using the unified representation of the compliance policy, to determine whether the compliance policy applies to the payload item; and if so, performing actions, identified in the unified representation of the compliance policy, relative to the payload item.

Example 17 is the computer-implemented method of any or all previous examples wherein performing actions comprises:

calling the workload to create an action object to perform workload-specific actions on the payload item.

Example 18 is the computer-implemented method of any or all previous examples wherein receiving a unified representation of the payload item comprises:

calling an application programming interface (API), exposed by the workload, from a policy evaluation system on the workload to obtain data from the payload item; and arranging the data according to a unified schema to obtain the unified representation of the payload item.

Example 19 is the computer-implemented method of any or all previous examples wherein evaluating comprises:

creating a runtime representation of the rules in the compliance policy, based on the unified representation of the compliance policy.

Example 20 is the computer-implemented method of any or all previous examples wherein creating a runtime representation comprises:

parsing the unified representation of the compliance policy to identify nodes representative of each rule in the policy; and creating a runtime representation of each of the rules identified.

Although the subject matter has been described in language-specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
 a compliance item generator configured to generate a unified payload item representation of a payload item from a workload on which the compliance item generator is used, the unified payload item representation being unified across a plurality of different workloads;
 a rule parser component configured to access a unified representation of a compliance policy rule and generate a runtime representation of the compliance policy rule, the runtime representation including condition representations of conditions under which the compliance policy rule applies to the payload item represented by the unified payload item representation;

a matching component configured to match the conditions in the runtime representation of the compliance policy rule against information in the unified payload item representation to determine whether a match occurs;

an action component configured to perform an action, identified in the runtime representation of the compliance policy rule, in response to the match; and at least one computer processor that is a functional part of the computer system and that is activated to facilitate generating the unified payload item representation, generating the runtime representation of the compliance policy rule, matching the conditions, and performing the actions.

2. The computer system of claim 1 wherein the rule parser is configured to generate the action component.

3. The computer system of claim 2 wherein the rule parser is configured to generate the action component by determining that the action is a workload-specific action, and, based on the determination, call an application programming interface (API) exposed by the workload to have the workload generate the action component.

4. The computer system of claim 1 wherein the compliance item generator is configured to generate the unified payload item representation of the payload item by calling an application programming interface (API) exposed by the workload to extract information from the payload to form the unified payload item representation.

5. The computer system of claim 4 wherein the compliance item generator is configured to call the API to obtain common content that is common to all unified payload item representations and to obtain text from the payload item.

6. The computer system of claim 1 wherein the action component is configured to call the workload to create an action object to perform workload-specific actions on the payload item.

7. The computer system of claim 1 and further comprising:

a status generator configured to generate a deployment status indicator that is indicative of deployment of the compliance policy rule to the workload, wherein the deployment status indicator is communicated to a policy status processing system.

8. A computer-implemented method, comprising:
receiving a unified representation of a compliance policy to be deployed at a given workload, the unified representation being formed according to a policy schema that is common across different workloads;
deploying the compliance policy at the given workload;
receiving a unified representation of a payload item from a workload, the unified representation of the payload item being unified across workloads;
evaluating the payload item, using the unified representation of the payload item, against rules in the compliance policy, using the unified representation of the compliance policy, to determine whether the compliance policy applies to the payload item; and
if so, performing actions, identified in the unified representation of the compliance policy, relative to the payload item.

9. The computer-implemented method of claim 8 wherein performing actions comprises:
calling the workload to create an action object to perform workload-specific actions on the payload item.

10. The computer-implemented method of claim 9 wherein receiving a unified representation of the payload item comprises:
calling an application programming interface (API), exposed by the workload, from a policy evaluation system on the workload to obtain data from the payload item; and
arranging the data according to a unified schema to obtain the unified representation of the payload item.

11. The computer-implemented method of claim 8 wherein evaluating comprises:
creating a runtime representation of the rules in the compliance policy, based on the unified representation of the compliance policy.

12. The computer-implemented method of claim 11 wherein creating a runtime representation comprises:
parsing the unified representation of the compliance policy to identify nodes representative of each rule in the policy; and
creating a runtime representation of each of the rules identified.

13. The computer-implemented method of claim 11, and further comprising:
generating a deployment status indicator that is indicative of deployment of the compliance policy rule to the workload; and
communicating the deployment status indicator to a policy status processing system.

14. A computing system comprising:
a processor; and
memory storing instructions executable by the processor, wherein the instructions configure the computing system to:
generate a unified payload item representation of a payload item from a workload on which the compliance item generator is used, the unified payload item representation being unified across a plurality of different workloads;
access a unified representation of a compliance policy rule and generate a runtime representation of the compliance policy rule, the runtime representation including condition representations of conditions under which the compliance policy rule applies to the payload item represented by the unified payload item representation;
match the conditions in the runtime representation of the compliance policy rule against information in the unified payload item representation to determine whether a match occurs; and
perform an action, identified in the runtime representation of the compliance policy rule, in response to the match.

15. The computing system of claim 14 wherein the instructions configure the computing system to generate an action component that performs the action.

16. The computing system of claim 15 wherein the instructions configure the computing system to generate the action component by determining whether the action is a workload-specific action, and, if so, calling an application programming interface (API) exposed by the workload to have the workload generate the action component.

17. The computing system of claim 14 wherein the instructions configure the computing system to generate the unified payload item representation of the payload item by calling an application programming interface (API) exposed by the workload to extract information from the payload to form the unified payload item representation.

18. The computing system of claim 17 wherein the instructions configure the computing system to call the API to obtain common content that is common to all unified payload item representations and to obtain text from the payload item.

19. The computing system of claim 14, wherein the instructions configure the computing system to call the workload to create an action object to perform workload-specific actions on the payload item.

20. The computing system of claim 14, wherein the instructions configure the computing system to:
  generate a deployment status indicator that is indicative of deployment of the compliance policy rule to the workload; and
  communicate the deployment status indicator to a policy status processing system.

* * * * *